(12) United States Patent
Hasegawa et al.

(10) Patent No.: US 7,218,018 B2
(45) Date of Patent: May 15, 2007

(54) ACTUATOR

(75) Inventors: Yuya Hasegawa, Kyoto (JP); Katsuhiro Hirata, Sanda (JP); Yoshio Mitsutake, Kashiba (JP); Tomohiro Ota, Osaka (JP); Ryo Motohashi, Hikone (JP); Tomohiro Kunita, Hikone (JP); Hiroaki Shimizu, Hikone (JP); Hidekazu Yabuuchi, Hikone (JP); Takahiro Nishinaka, Omihachiman (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/518,547

(22) PCT Filed: Nov. 25, 2003

(86) PCT No.: PCT/JP03/14987

§ 371 (c)(1),
(2), (4) Date: Jan. 3, 2005

(87) PCT Pub. No.: WO2004/049547

PCT Pub. Date: Jun. 10, 2004

(65) Prior Publication Data

US 2005/0200207 A1 Sep. 15, 2005

(30) Foreign Application Priority Data

Nov. 26, 2002 (JP) ............................. 2002-342760
Nov. 26, 2002 (JP) ............................. 2002-342761

(51) Int. Cl.
*H02K 33/00* (2006.01)
(52) U.S. Cl. ........................... 310/12; 310/15; 310/17; 310/36; 310/112; 318/115
(58) Field of Classification Search ................. 310/15, 310/36; 318/115
See application file for complete search history.

(56) References Cited

U.S. PATENT DOCUMENTS 3,394,295 A * 7/1968 Cory .......................... 318/115

(Continued)

FOREIGN PATENT DOCUMENTS

DE 3538017 4/1987

(Continued)

OTHER PUBLICATIONS

English Language Abstract of JP 2000-004575.

(Continued)

*Primary Examiner*—Burton Mullins
(74) *Attorney, Agent, or Firm*—Greenblum & Bernstein, P.L.C.

(57) ABSTRACT

An actuator includes a casing, a stationary member having a coil member and mounted in the casing and a movable member having a moving element and supported by the casing. The moving element has a shaft and is supported by the casing so as to be moved in an axial direction of the shaft and in a rotational direction having the axial direction of the shaft as its rotational axis and the moving element is moved in the axial direction and in the rotational direction by causing electric current to flow through the coil member. The stationary member includes a first stationary member for imparting to the movable member a force oriented in the axial direction and a second stationary member for imparting to the movable member a force oriented in the rotational direction, while the coil member includes a first coil member for exciting a first magnetic path passing through the first stationary member and a second coil member for exciting a second magnetic path passing through the second stationary member.

15 Claims, 27 Drawing Sheets

U.S. PATENT DOCUMENTS

| | | | | |
|---|---|---|---|---|
| 3,453,510 | A | * 7/1969 | Kreuter et al. | 318/674 |
| 3,851,196 | A | * 11/1974 | Hinds | 310/12 |
| 4,099,106 | A | * 7/1978 | Nikaido | 318/115 |
| 4,197,488 | A | * 4/1980 | Kant | 318/115 |
| 4,234,831 | A | * 11/1980 | Kemmer et al. | 318/115 |
| 4,281,263 | A | * 7/1981 | Virolleau et al. | 310/13 |
| 4,607,197 | A | * 8/1986 | Conrad | 318/116 |
| 5,093,596 | A | 3/1992 | Hammer | 310/191 |
| 5,952,744 | A | * 9/1999 | Chitayat | 310/12 |
| 6,429,611 | B1 | * 8/2002 | Li | 318/115 |
| 6,611,074 | B2 | * 8/2003 | Bartolotti | 310/114 |
| 6,798,087 | B1 | * 9/2004 | Swift | 310/12 |
| 2001/0043016 | A1 | 11/2001 | Chun et al. | |
| 2002/0195884 | A1 | 12/2002 | Ichii et al. | |
| 2004/0130221 | A1 | 7/2004 | Ichii et al. | |

FOREIGN PATENT DOCUMENTS

| | | | |
|---|---|---|---|
| JP | 60-128859 | * | 7/1985 |
| JP | 61-214765 | * | 9/1986 |
| JP | 62-40052 | * | 2/1987 |
| JP | 8-275484 | * | 10/1996 |
| JP | 2000-004575 | | 1/2000 |
| JP | 2002-078310 | | 3/2002 |
| JP | 2002-199689 | | 7/2002 |
| WO | 2004/047670 | | 6/2004 |

OTHER PUBLICATIONS

English Language Abstract of DE 3538017.
English Language Abstract of JP 2002-078310.
English Language Abstract of JP 2002-199689.
U.S. National Stage Appl. No. 10/525,526 to Motohashi et al., filed Feb. 24, 2005.

* cited by examiner

ACTUATOR

TECHNICAL FIELD

The present invention relates an actuator which is capable of moving in two directions of an axial direction and a rotational direction.

BACKGROUND ART

Many actuators are adapted to move in one direction of a linear direction or a rotational direction. When an actuator is moved in two directions of the linear direction and the rotational direction, a motion direction converting mechanism for converting a motion direction mechanically is employed. However, when the motion direction converting mechanism converts the motion direction, noises are produced.

In a linear actuator in which a movable member (plunger) having a shaft is disposed inside a stationary member (yoke) so as to have a gap with the stationary member and a magnetic path is excited by a coil such that the movable member is moved in an axial direction of the shaft, Japanese Patent Laid-Open Publication No. 2002-78310 discloses an arrangement in which by making the gap nonuniform relative to axial displacement (stroke position) of the movable member, the movable member is moved in an axial direction of the shaft, i.e., in a linear direction and in a rotational direction having the axial direction as its rotational axis without using the motion direction converting mechanism.

Meanwhile, in a linear oscillator in which a first movable member (plunger) having a shaft is disposed inside a stationary member (yoke) provided in a casing so as to have a gap with the stationary member and a magnetic path is excited by a coil such that the first movable member is moved in an axial direction of the shaft, Japanese Patent Laid-Open Publication No. 2002-199689 discloses an arrangement in which a second movable member (amplitude control weight) serving to cancel inertia force of the first movable member is provided and spring members are provided among the casing, the first movable member and the second movable member such that not only by making the gap nonuniform relative to axial displacement (stroke position) of the first movable member, the first movable member performs on the basis of resonance in an axial direction of the shaft both reciprocating motion and motion in a rotational direction having the axial direction as its rotational axis without using the motion direction converting mechanism but vibrations of the first movable member due to axial inertia force can be reduced.

However, although the arrangements disclosed in Japanese Patent Laid-Open Publication Nos. 2002-78310 and 2002-199689 are advantageous in that the movable member can be moved in the two directions in response to axial displacement of the movable member by a simple construction without using the motion direction converting mechanism presenting a cause of noises, relation between motion of the movable member in the axial direction and motion of the movable member in the rotational direction is fixed by shape of the gap, so that the motion of the movable member in the axial direction and the motion of the movable member in the rotational direction cannot be controlled independently of each other and degree of freedom of operational control of the movable member is not so high.

DISCLOSURE OF INVENTION

In an actuator in which a movable member can be moved in two directions of an axial direction and a rotational direction without using a motion direction converting mechanism, an object of the present invention is, with a view to eliminating the above mentioned drawbacks of prior art, to upgrade degree of freedom of operational control of the movable member.

In order to accomplish this object of the present invention, an actuator of the present invention includes a casing. A stationary member has a coil member and is mounted in the casing. A movable member includes a moving element and is supported by the casing. The moving element has a shaft and is supported by the casing so as to be moved in an axial direction of the shaft and in a rotational direction having the axial direction of the shaft as its rotational axis. Electric current is caused to flow through the coil member such that the moving element is moved in the axial direction and in the rotational direction. The stationary member includes a first stationary member for imparting to the movable member a force oriented in the axial direction and a second stationary member for imparting to the movable member a force oriented in the rotational direction. The coil member includes a first coil member for exciting a first magnetic path passing through the first stationary member and a second coil member for exciting a second magnetic path passing through the second stationary member.

BEST MODE FOR CARRYING OUT THE INVENTION

Hereinafter, embodiments of the present invention are described with reference to the drawings.

(First Embodiment)

Figure 1:
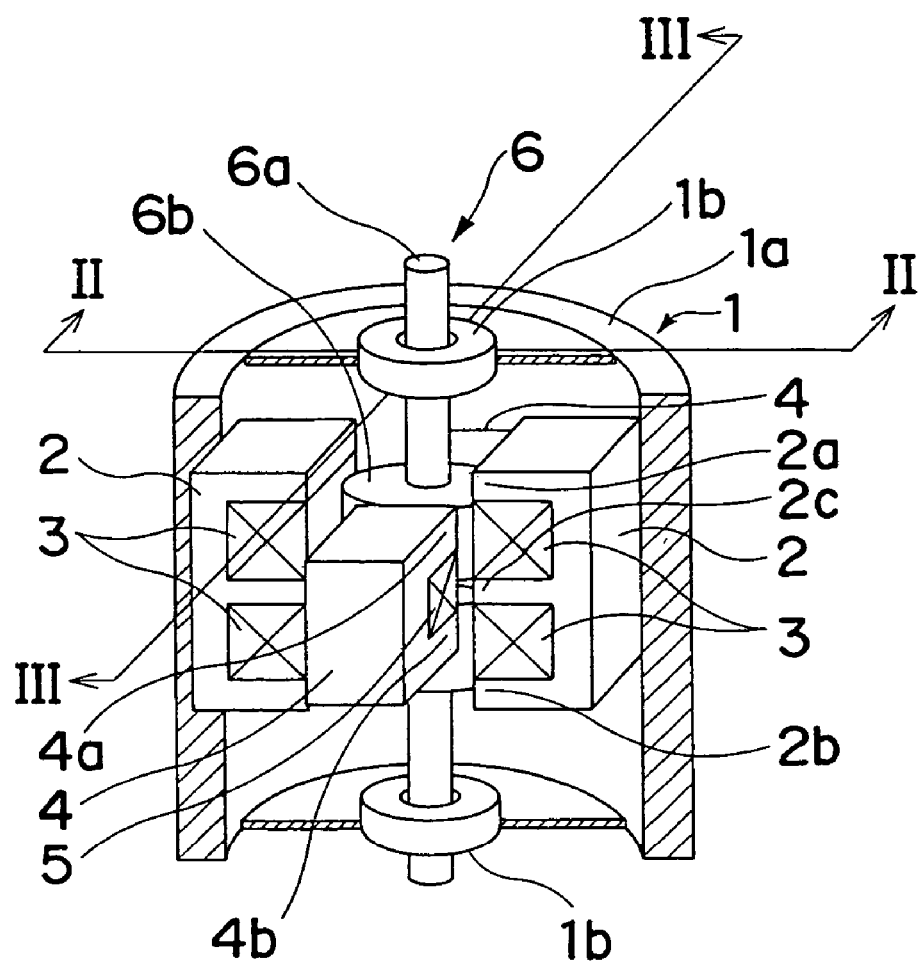
FIG. 1 is a partly sectional perspective view of an actuator according to a first embodiment of the present invention.

FIGS. 1 to 10 show an actuator according to a first embodiment of the present invention. As shown in FIG. 1, this actuator mainly includes a casing 1, a pair of first stationary members 2 each having a first coil 3 wound therearound, a pair of second stationary members 4 each having a second coil 5 wound therearound and a movable member 6. The movable member 6 includes a shaft 6a and a driving force generator 6b secured to the shaft 6a.

The casing 1 includes a housing portion 1a and a pair of bearing portions 1b and accommodates the first and second stationary members 2 and 4 and the movable member 6. The housing portion 1a is formed by metallic magnetic material into a cylindrical shape having a closed bottom. On the other hand, each of the bearing portions 1b is formed by a so-called ball bearing in which metal balls each having a smoothly worked surface are fitted into a cavity of a cylindrical tube having a concentric section. The two bearing portions 1b are, respectively, provided at centers of opposite end faces of the housing portion 1a such that a central axis of the housing portion 1a and a central axis of the bearing portions 1b coincide with each other. Furthermore, the two bearing portions 1b support the shaft 6a by the metal balls such that the shaft 6a of the movable member 6, namely, the movable member 6 can be moved in an axial direction of the shaft 6a, (hereinafter, referred to as the "axial direction") and in a rotational direction having the axial direction as its central axis, i.e., as its rotational axis, (hereinafter, referred to as the "rotational direction").

Figure 2:
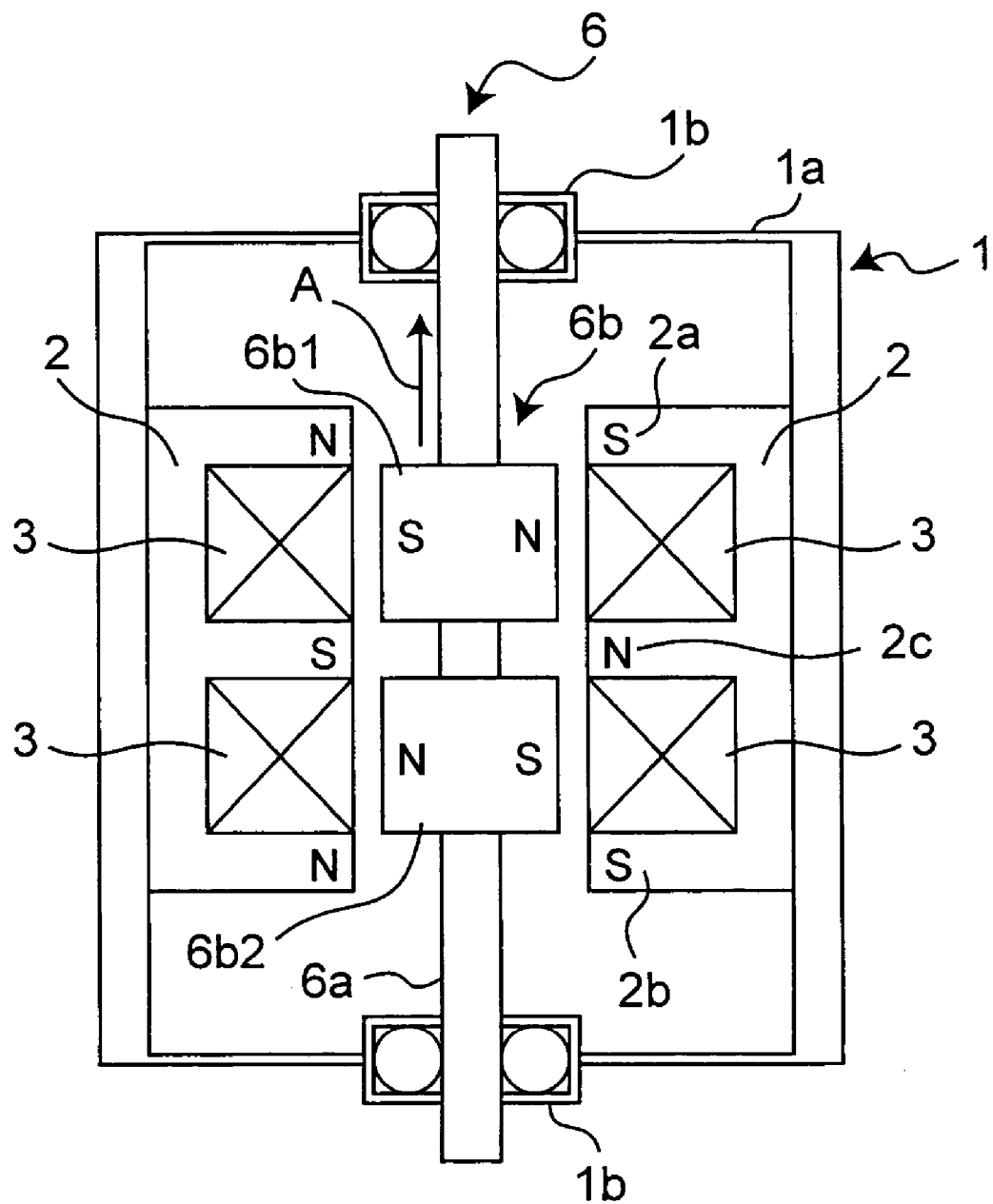
FIG. 2 is a sectional view taken along the line II—II in FIG. 1.

Each of the first stationary members 2 is formed by magnetic material into a pillar having an E-shaped section and has three magnetic pole potions arranged symmetrically in the axial direction, namely, magnetic pole portions 2a and 2b disposed at its opposite ends and a central magnetic pole portion 2c. The two first stationary members 2 are mounted in a hollow of the housing portion 1a of the casing 1 so as to be disposed symmetrically with respect to the rotational axis. The magnetic pole portions 2a to 2c of the first stationary member 2 have an identical width and an identical length. In the first stationary member 2, the first coil 3 is wound around the central magnetic pole portion 2c and different magnetic poles are produced at the central magnetic pole portion 2c and the opposite magnetic pole portions 2a and 2b by causing electric current to flow through the first coil 3. For example, as shown in FIG. 2, if an N-pole is produced at the central magnetic pole portion 2c, an S-pole is produced at the opposite magnetic pole portions 2a and 2b. Since the magnetic pole portions 2a to 2c are positioned so as to confront the movable member 6, the first stationary member 2 forms an efficient magnetic circuit in which leakage flux is small. The two first stationary members 2 are mainly used for applying to the movable member 6 a force oriented in the axial direction.

The first coil 3 is wound around the central magnetic pole portion 2c of the first stationary member 2 via a resinous coil bobbin (not shown). The first coil 3 is adapted to excite a magnetic path passing through the first stationary member 2, a gap between the first stationary member 2 and the movable member 6 and the movable member 6. Meanwhile, the first coil 3 provided in one of the two first stationary members 2 and the first coil 3 provided in the other first stationary member 2 are connected to each other so as to perform excitation in an antiphase manner. For example, as shown in FIG. 2, when the central magnetic pole portion 2c of the one first stationary member 2 is excited to the N-pole, the central magnetic pole 2c of the other first stationary member 2 is excited to the S-pole upon connection of the two first coils 3.

Figure 3:
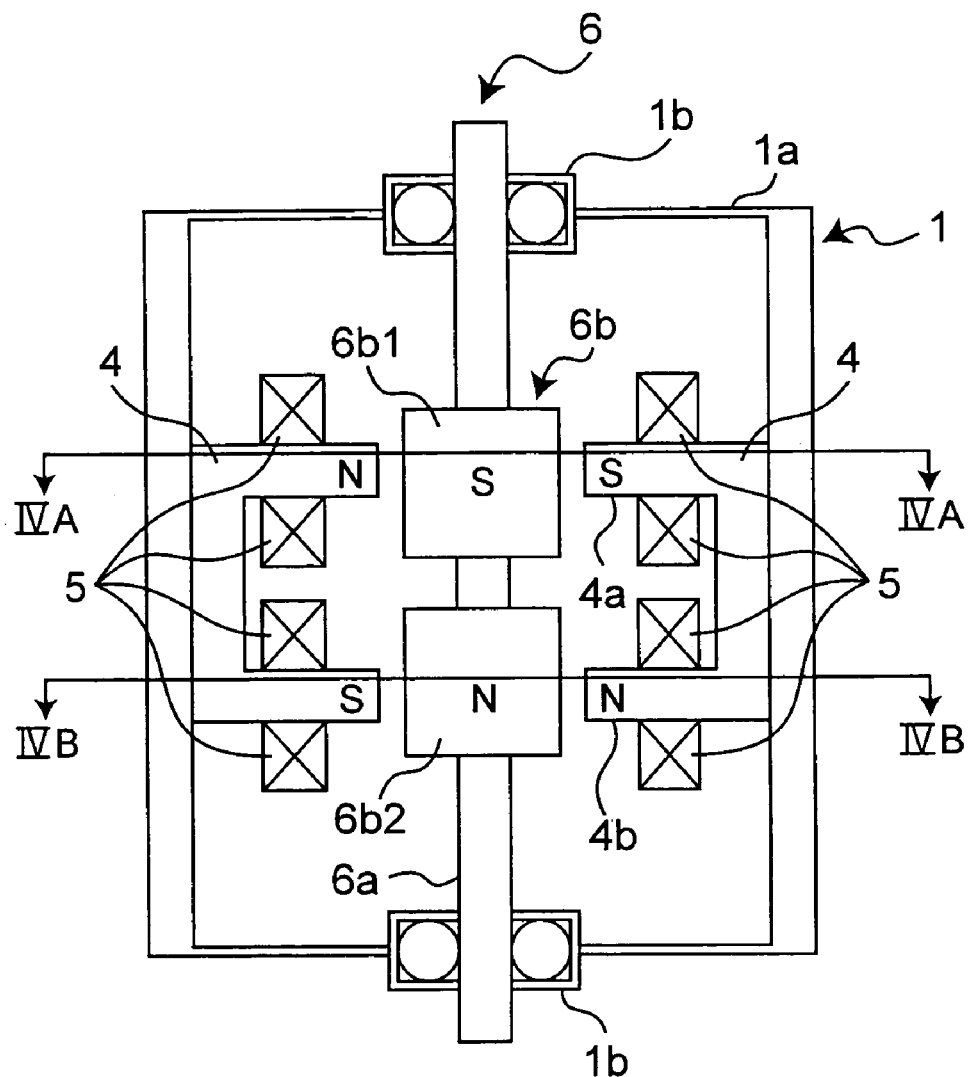
FIG. 3 is a sectional view taken along the line III—III in FIG. 1.
Figure 4A:
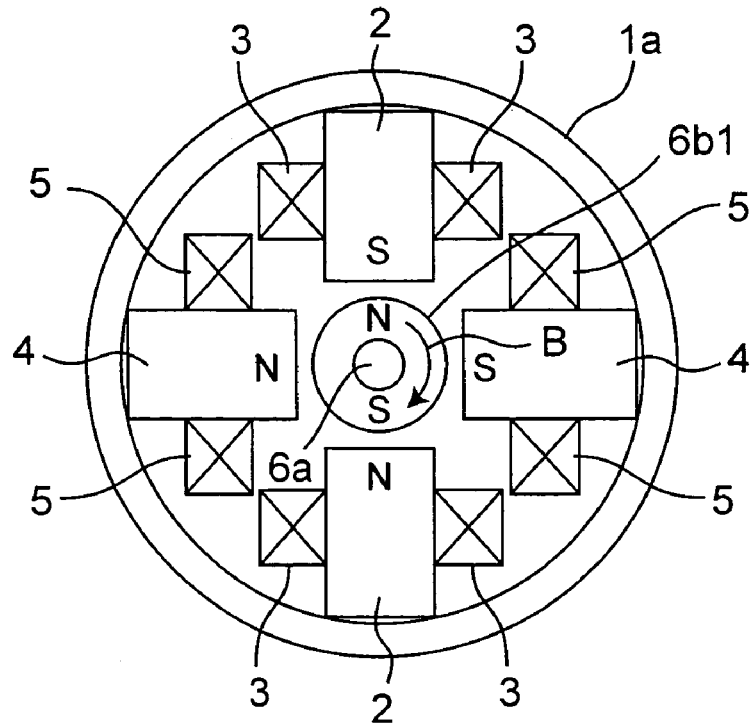
FIGS. 4A and 4B are sectional views taken along the lines IVA—IVA and IVB—IVB in FIG. 3, respectively.
Figure 4B:
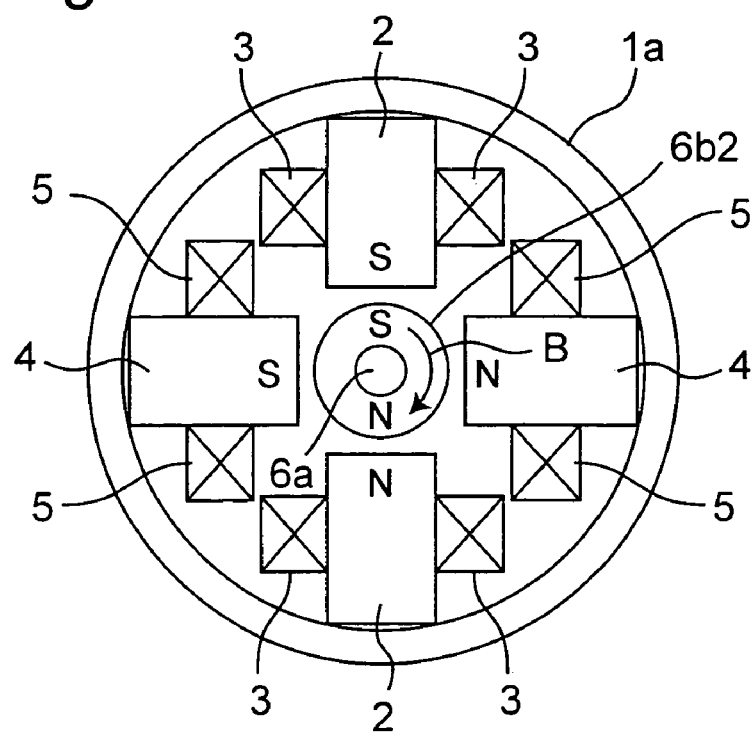

Each of the second stationary members 4 is formed by magnetic material into a pillar having a C-shaped section and has two magnetic pole portions 4a and 4b arranged symmetrically in the axial direction. The two second stationary members 4 are mounted in the hollow of the housing portion 1a of the casing 1 so as to be disposed symmetrically with respect to the rotational axis. As shown in FIGS. 4A and 4B, an axial plane containing the two first stationary members 2 and an axial plane containing the two second stationary members 4 intersect with each other orthogonally. Hence, since an interval between the first stationary member 2 and the second stationary member 4 becomes large, a space for providing the first coil 3 and the second coil 5 can be made large. The magnetic pole portions 4a and 4b of the second stationary member 4 have an identical width and an identical length. Meanwhile, as shown in FIG. 3, in each of the second stationary members 4, the second coil 5 is dividedly wound around the magnetic pole portions 4a and 4b and different magnetic poles are produced at the magnetic pole portions 4a and 4b by causing electric current to flow through the second coil 5. For example, as shown in FIG. 3, if an S-pole is produced at the magnetic pole portion 2a, an N-pole is produced at the magnetic pole portion 4b. Since the magnetic pole portions 4a and 4b are positioned so as to confront the movable member 6, the second stationary member. 4 forms an efficient magnetic circuit in which leakage flux is small. The two second stationary members 4 are mainly used for applying to the movable member 6 a force oriented in the rotational direction.

The second coil 5 is dividedly wound around the magnetic pole portions 4a and 4b by way of a resinous coil bobbin for each of the magnetic pole portions 4a and 4b. The second coil 5 is adapted to excite a magnetic path passing through the second stationary member 4, a gap between the second stationary member 4 and the movable member 6 and the movable member 6. Meanwhile, the second coil 5 provided in one of the two second stationary members 4 and the second coil 5 provided in the other second stationary member 4 are connected to each other so as to perform excitation in an antiphase manner. For example, as shown in FIG. 3, when the magnetic pole portion 4a of the one second stationary member 4 is excited to the S-pole, the magnetic pole portion 4a of the other second stationary member 4 is excited to the N-pole upon connection of the two second coils 5.

As described above, the movable member 6 includes the shaft 6a and the driving force generator 6b. The shaft 6a is formed by a metallic cylinder and is supported by the two bearing portions 1b so as to be moved in the axial direction and in the rotational direction. The driving force generator 6b is formed by two cylindrical and tubular magnets 6b1 and 6b2 magnetized radially such that a magnetization direction, i.e., a direction of orientation from the S-pole to the N-pole in the magnet 6b1 is opposite to that of the magnet 6b2 as shown in FIGS. 4A and 4B. The magnets 6b1 and 6b2 are mounted on the shaft 6a such that a central axis of the magnets 6b1 and 6b1 coincides with that of the shaft. 6a. Thus, the magnets 6b1 and 6b2 are provided symmetrically with respect to the rotational axis such that the magnetization directions of the magnets 6b1 and 6b2 intersect with the axial direction orthogonally. Therefore, since masses of the magnets 6b1 and 6b2 are distributed symmetrically with respect to the rotational axis, inertia force based on motion of the movable member 6 in the rotational direction is cancelled and thus, vibrations to be transmitted to the casing 1 can be reduced.

Meanwhile, since a pair of the first stationary members 2 apply to the movable member 6 the force oriented in the axial direction by using two sets of the magnetic pole portions 2a to 2c disposed at opposite sides of the magnets 6b1 and 6b2 of the movable member 6, respectively and a pair of the second stationary members 4 apply to the movable member 6 the force oriented in the rotational direction by using two sets of the magnetic pole portions 4a and 4b disposed at opposite sides of the magnets 6b1 and 6b2 of the movable member 6, respectively, the movable member 6 can be moved with great force. Here, the driving force generator 6b of the movable member 6 has a cylindrical magnetic pole face, while the magnetic pole portions of the first and second stationary members 2 and 4 have flat magnetic pole faces. As shown in FIG. 2, each of the magnets 6b1 and 6b2 has a thickness equal to a width of each recess of the first stationary member 2 having the E-shaped magnetic pole portions 2a to 2c. As shown in FIG. 2, the magnets 6b1 and 6b2 are provided on the shaft 6a so as to be spaced away from each other in the axial direction such that a side face of each of the magnets 6b1 and 6b2 confronts each recess of the first stationary member 2. At this time, the magnets 6b1 and 6b2 confront the magnetic pole portions 4a and 4b of the second stationary member 4, respectively as shown in FIG. 3. As shown in FIGS. 4A and 4B, a diameter of the magnets 6b1 and 6b2 is set such that a gap is formed between the circular magnetic pole face of the driving force generator 6b of the movable member 6 and each of the flat magnetic pole faces of the magnetic pole portions of the first and second stationary members 2 and 4.

By causing electric current to flow through the first coil 3 in the above described arrangement, magnetic poles shown in, for example, FIG. 2 are, respectively, produced in the magnetic pole portions 2a to 2c of the first stationary member 2. Then, the magnet 6b1 undergoes an attraction force and a repulsion force from the upper magnetic pole portion 2a and the central magnetic pole portion 2c of the first stationary member 2, respectively. On the other hand, the magnet 6b2 undergoes an attraction force and a repulsion force from the central magnetic pole portion 2c and the lower magnetic pole portion 2b of the first stationary member 2, respectively. Therefore, the movable member 6 undergoes from the first stationary member 2 a force oriented in the axial direction, i.e., in the upward direction of the arrow A in FIG. 2. If electric current is caused to flow through the first coil 3 in the direction opposite to that of the above, polarities of the magnetic poles produced at the magnetic pole portions 2a to 2c become opposite to those of the above, so that the movable member 6 undergoes a force oriented in the opposite axial direction.

Meanwhile, by causing electric current to flow through the second coil 5, magnetic poles shown in, for example, FIGS. 4A and 4B are, respectively, produced in the magnetic pole portions 4a and 4b of the second stationary member 4. At this time, in FIG. 4A, since the magnet 6b1 undergoes a force mainly from the second stationary members 4, the magnet 6b1 undergoes a force oriented in the clockwise rotational direction of the arrow B. Meanwhile, in FIG. 4B, since the magnet 6b2 also undergoes a force mainly from the second stationary members 4, the magnet 6b2 undergoes a force oriented in the clockwise rotational direction of the arrow B. Therefore, in FIGS. 4A and 4B, the movable member 6 undergoes from the second stationary members 4 the force oriented in the clockwise rotational direction. Meanwhile, if electric current is caused to flow through the second coil 5 in the direction opposite to the above, polarities of the magnetic poles produced at the magnetic pole portions 4a and 4b of the second stationary member 4 become opposite to those of the above, so that a force oriented in a counterclockwise rotational direction is applied to the movable member 6.

Figure 5:
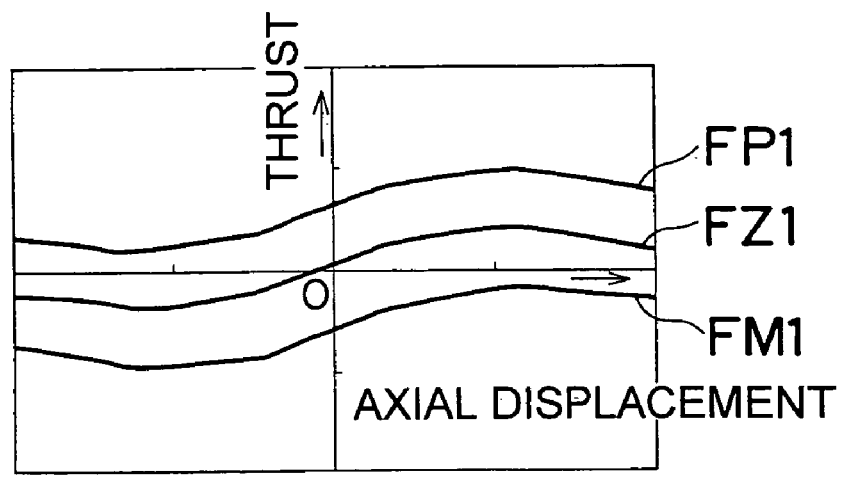
FIG. 5 is a characteristic diagram showing relation between axial displacement and thrust in the actuator of FIG. 1.
Figure 6:
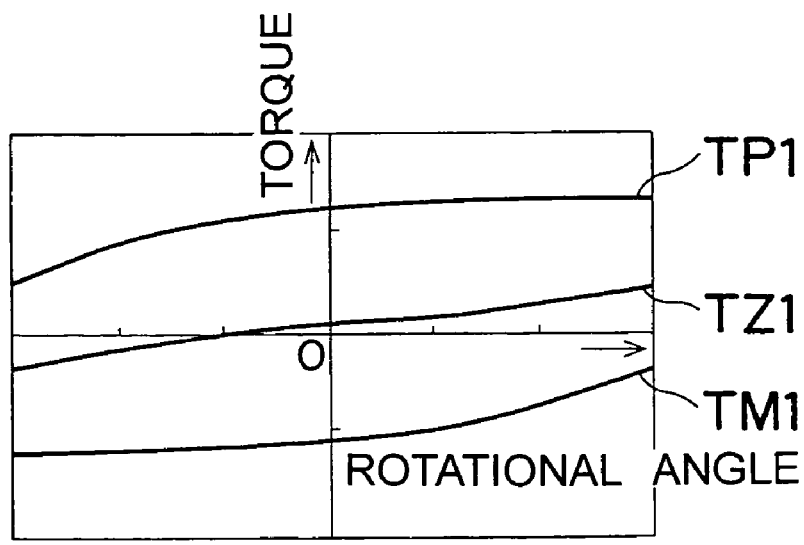
FIG. 6 is a characteristic diagram showing relation between rotational angle and torque in the actuator of FIG. 1.

Therefore, since motion of the movable member 6 in the axial direction and motion of the movable member 6 in the rotational direction can be controlled independently of each other in the actuator, the actuator has thrust characteristics relative to axial displacement as shown in FIG. 5 and torque characteristics relative to rotational angle in the rotational direction as shown in FIG. 6. Namely, in FIG. 5, a curve FZ1 represents thrust characteristics obtained at the time electric current does not flow through the first coil 3, a curve FP1 represents thrust characteristics obtained at the time electric current flows through the first coil 3 in a plus direction and a curve FM1 represents thrust characteristics obtained at the time electric current flows through the first coil 3 in a minus direction. On the other hand, in FIG. 6, a curve TZ1 represents torque characteristics obtained at the time electric current does not flow through the second coil 5, a curve TP1 represents torque characteristics obtained at the time electric current flows through the second coil 5 in a plus direction and a curve TM1 represents torque characteristics obtained at the time electric current flows through the second coil 5 in a minus direction.

Here, in the thrust characteristics, a layout in which the first stationary members 2 and the movable member 6 are disposed as shown in FIG. 2 is employed as a reference position in the axial direction, while in the torque characteristics, a layout in which the first stationary members 2, the second stationary members 4 and the movable member 6 are disposed as shown in FIGS. 4A and 4B is employed as a reference position in the rotational direction. Therefore, if an AC voltage is applied to the first coil 3 and the second coil 5, electric current flows through each of the first coil 3 and the second coil 5 in the plus and minus directions, so that the movable member 6 is reciprocated in two directions of the axial direction and the rotational direction.

Figure 7:
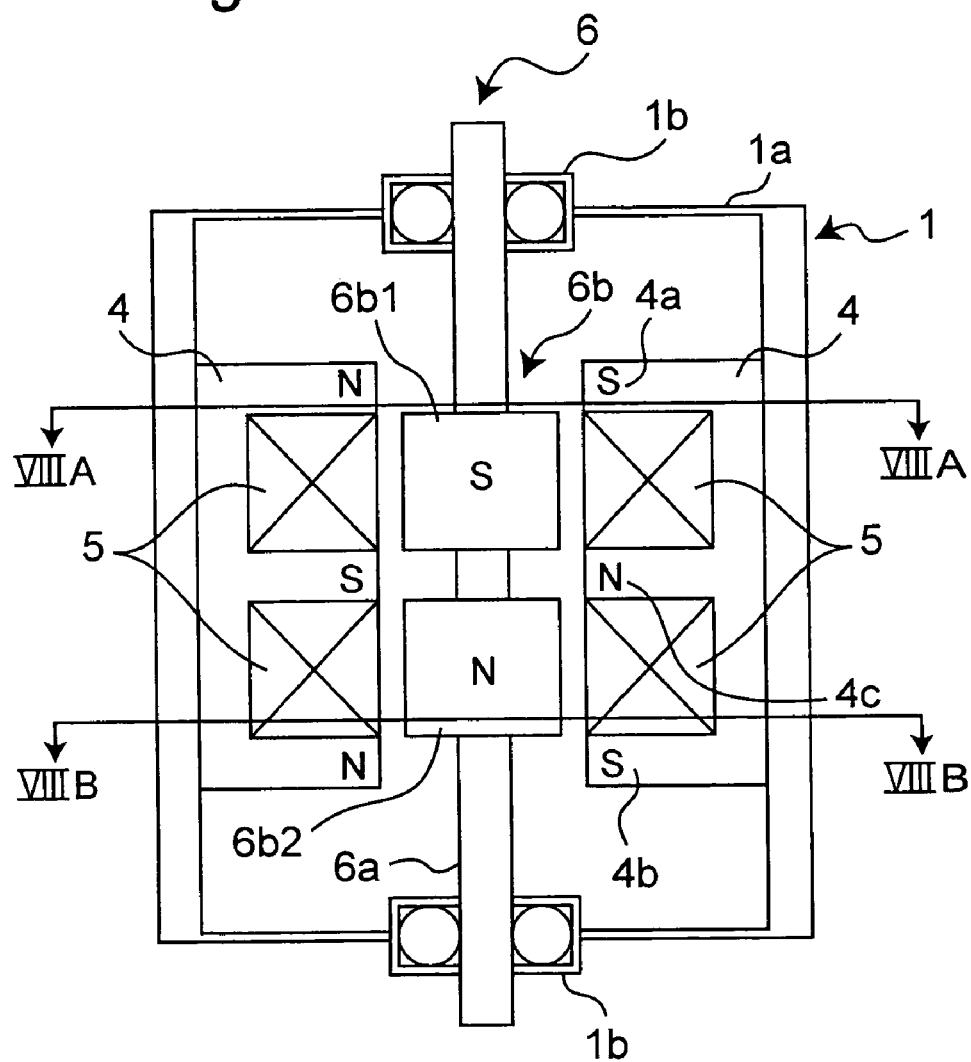
FIG. 7 is a sectional view corresponding to FIG. 3, showing an actuator which is a modification of the actuator of FIG. 1.
Figure 8A:
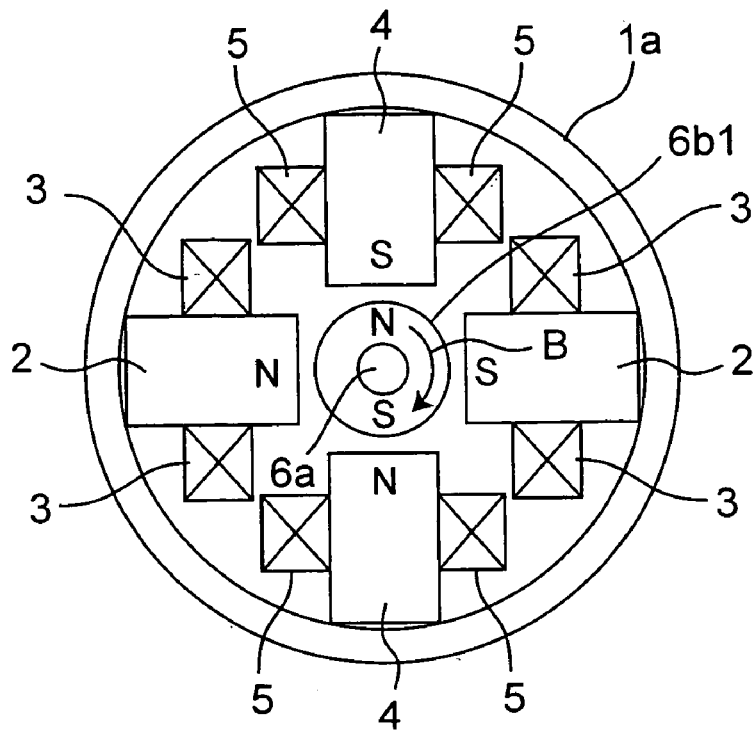
FIGS. 8A and 8B are sectional views taken along the lines VIIIA—VIIIA and VIIIB—VIIIB in FIG. 7, respectively.
Figure 8B:
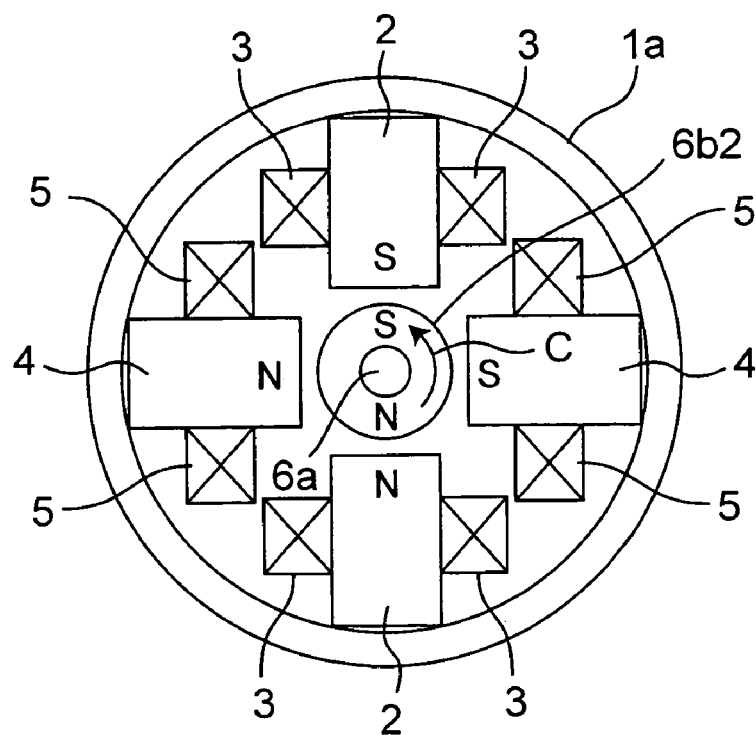

In FIG. 7 showing an actuator which is a modification of the actuator of FIG. 1, the second stationary member 4 is formed into an E-shaped configuration having three magnetic pole portions, i.e., the opposite magnetic pole portions 4a and 4b and a central magnetic pole portion 4c in the same manner as the first stationary member 2. At this time, in FIG. 8A, the magnet 6b1 and the upper magnetic pole portion 4a of the second stationary member 4 are positioned relative to each other such that a force for causing the magnet 6b1 to perform clockwise rotary motion of the arrow B is generated. Meanwhile, in FIG. 8B, the magnet 6b2 and the lower magnetic pole portion 4b of the second stationary member 4 are positioned relative to each other such that a force for causing the magnet 6b2 to perform counterclockwise rotary motion of the arrow C is generated. Hence, since the rotational direction of the magnet 6b1 is opposite to that of the magnet 6b2, rotary motion of the magnet 6b1 and rotary motion of the magnet 6b2 cancel each other. Meanwhile, since the magnetic pole faces of the magnets 6b1 and 6b2 do not confront those of the second stationary member 4 as shown in FIG. 7, a force applied to the movable member 6 from the second stationary members 4 is small. Therefore, by employing the C-shaped second stationary member 4 of FIG. 1 in place of the E-shaped second stationary member 4 of FIG. 7, a force applied to the movable member 6 in the rotational direction from the second stationary members 4 can be increased.

Then, operation of the actuator according to the first embodiment of the present invention is described. It is supposed that the movable member 6 is disposed at the reference position in the axial direction of FIG. 2 and at the reference position in the rotational direction of FIGS. 4A and 4B and electric current does not flow through the first coil 3 and the second coil 5. At this time, since the movable member 6 is in a balanced state as shown by the curve FZ1 in FIG. 5 and the curve TZ1 in FIG. 6, the movable member 6 is at a standstill without undergoing any force both in the axial direction and in the rotational direction.

Figure 9:
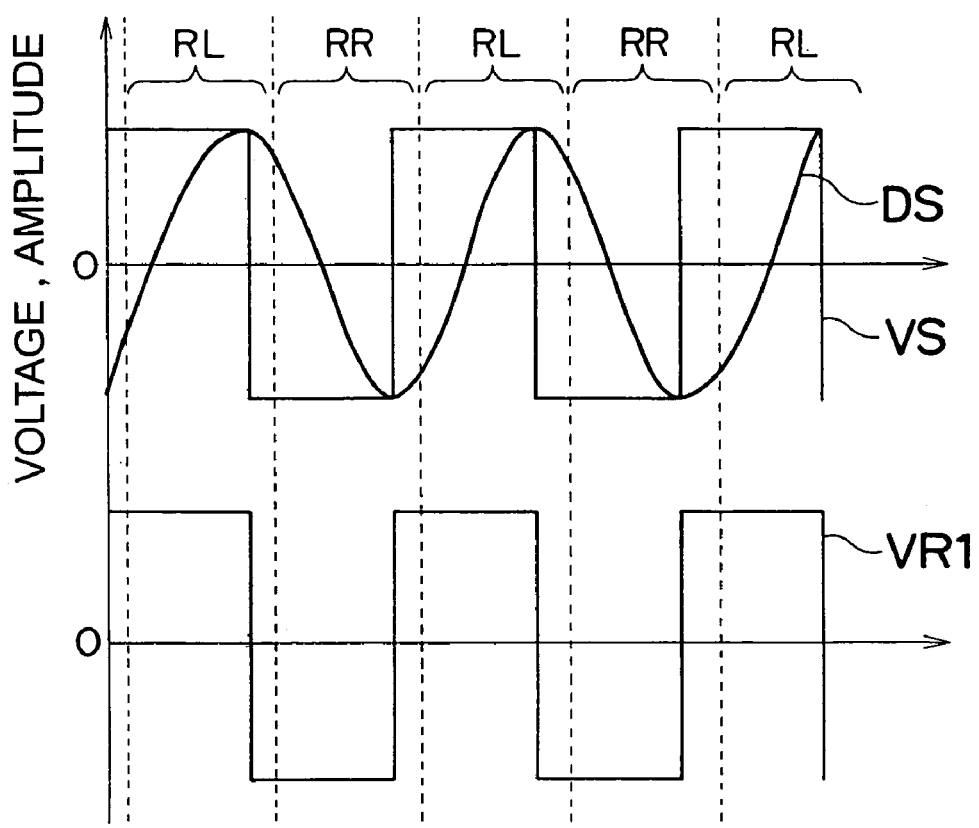
FIG. 9 is a waveform diagram showing operation of the actuator of FIG. 1.
Figure 10:
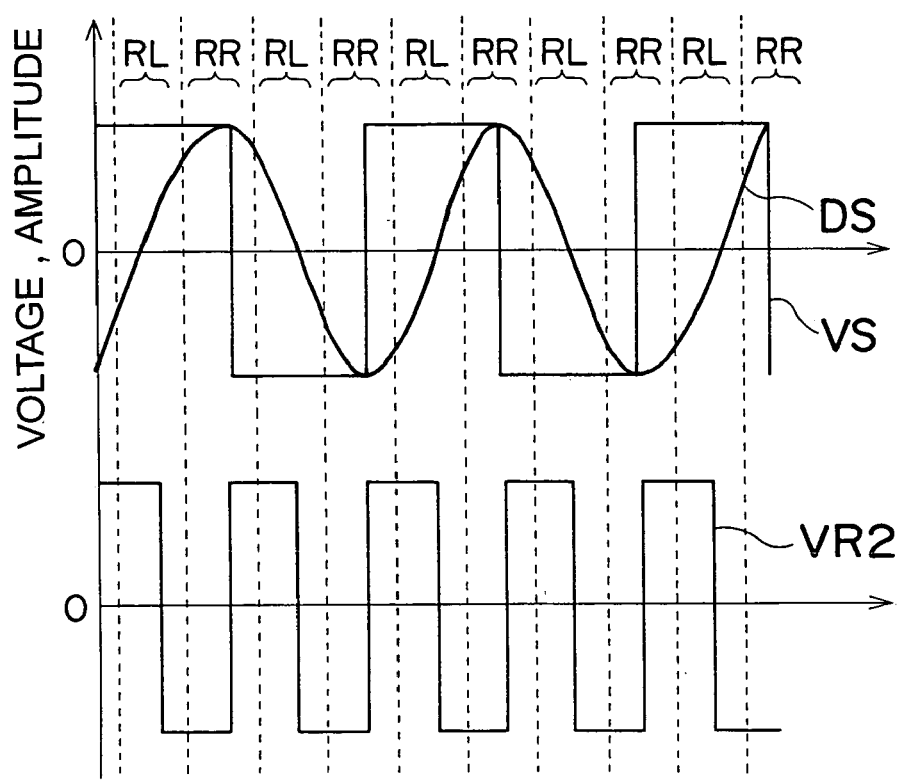
FIG. 10 is a waveform diagram showing another operation of the actuator of FIG. 1.

Here, if AC voltages of rectangular waves having waveforms VS and VR1 as shown in FIG. 9 are, respectively, applied to the first coil 3 and the second coil 5, AC flows through the first coil 3 and the second coil 5. Thus, the first coil 3 excites the magnetic path passing through the first stationary member 2 and the second coil 5 excites the magnetic path passing through the second stationary member 4. Hence, the movable member 6 undergoes the force oriented in the axial direction in FIG. 5 and the force oriented in the rotational direction in FIG. 6. Phase of AC flowing through the first coil 3 and the second coil 5 changes according to motion of the movable member 6 and the number of turns of each of the first coil 3 and the second coil 5 but the movable member 6 is moved in the axial direction as shown by, for example, a curve DS of FIG. 9 by AC flowing through the first coil 3. On the other hand, in the phase shown in, for example, FIG. 9, the second coil 5 causes the movable member 6 to perform counterclockwise rotary motion in an interval RL and clockwise rotary motion in an interval RR. Therefore, the movable member 6 performs reciprocating motion in the rotational direction at a period identical with that of the axial direction while performing reciprocating motion in the axial direction.

Meanwhile, in this actuator, motion of the movable member 6 in the axial direction and motion of the movable member 6 in the rotational direction can be controlled independently of each other as described above. Thus, if a frequency of an AC voltage applied to the second coil 5 and indicated by a waveform VR2 is set to be twice that of an AC voltage applied to the first coil 3 and indicated by a waveform VS as shown in, for example, FIG. 10, the movable member 6 is capable of performing two reciprocating motions in the rotational direction while performing one reciprocating motion in the axial direction.

In the actuator according to the first embodiment of the present invention referred to above, the force oriented in the axial direction is applied to the movable member 6 when the magnetic path passing through the first stationary member 2 is excited by the first coil 3, while the force oriented in the rotational direction is applied to the movable member 6 when the magnetic path passing through the second stationary member 4 is excited by the second coil 5. Thus, motion of the movable member 6 in the axial direction and motion of the movable member 6 in the rotational direction can be controlled independently of each other. As a result, it is possible to upgrade degree of freedom of operational control of the actuator in which the movable member 6 can be moved in two directions of the axial direction and the rotational direction without using a motion direction converting mechanism.

In addition, since the masses of the magnets 6b1 and 6b2 of the movable member 6 are distributed symmetrically with respect to the rotational axis, inertia force based on motion of the movable member 6 in the rotational direction is cancelled and thus, vibrations to be transmitted to the casing 1 can be reduced. Meanwhile, since a pair of the first stationary members 2 apply to the movable member 6 the force oriented in the axial direction by using two sets of the magnetic pole portions 2a to 2c disposed at opposite sides of the magnets 6b1 and 6b2 of the movable member 6, respectively and a pair of the second stationary members 4 apply to the movable member 6 the force oriented in the rotational direction by using two sets of the magnetic pole portions 4a and 4b disposed at opposite sides of the magnets 6b1 and 6b2 of the movable member 6, respectively, the movable member 6 can be moved with great force.

Furthermore, if the first stationary member 2 is formed into the E-shaped configuration having the magnetic pole portions 2a to 2c, the second stationary member 4 is formed into the C-shaped configuration having the magnetic pole portions 4a and 4b and the first stationary members 2 and the second stationary members 4 are disposed so as to intersect with each other orthogonally, an interval between the first stationary members 2 and the second stationary members 4 becomes large, so that a space for providing the first coil 3 in the first stationary member 2 and a space for providing the second coil 5 in the second stationary member 4 can be made large. Meanwhile, when the first stationary member 2 is positioned so as to confront the magnets 6b1 and 6b2 of the movable member 6, the magnetic pole portions 2a to 2c of the first stationary member 2 are disposed at positions suitable for producing the force oriented in the axial direction, so that the first stationary member 2 lessens leakage flux and the movable member 6 can be efficiently moved in the axial direction with great force. On the other hand, when the second stationary member 4 is positioned so as to confront the magnets 6b1 and 6b2 of the movable member 6, the magnetic pole portions 4a and 4b of the second stationary member 4 are disposed at positions suitable for producing the force oriented in the rotational direction, so that the second stationary member 4 lessens leakage flux and the movable member 6 can be efficiently moved in the rotational direction with great force.

(Second Embodiment)

Figure 11:
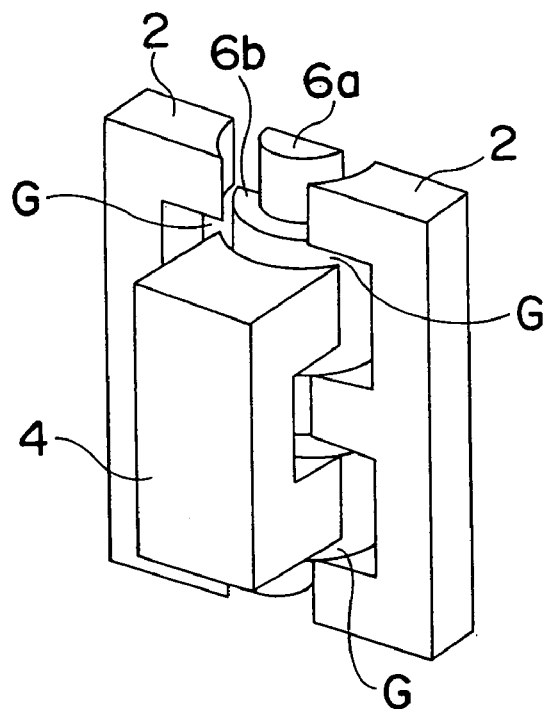
FIG. 11 is a fragmentary perspective view of an actuator according to a second embodiment of the present invention.
Figure 12:
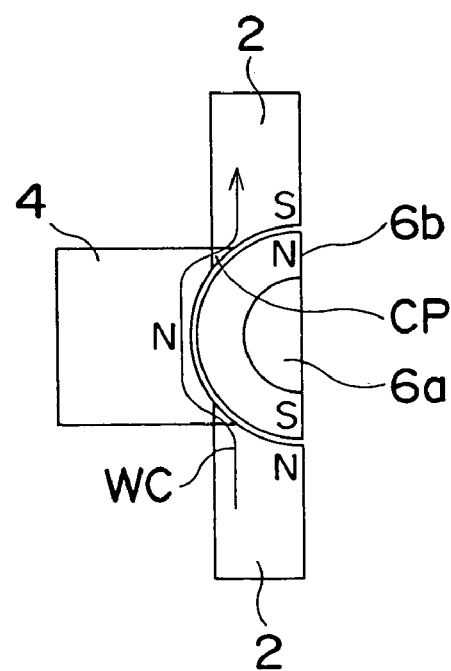
FIG. 12 is a top plan view of the actuator of FIG. 11.

Then, FIGS. 11 and 12 show an actuator according to a second embodiment of the present invention. This actuator is different from the actuator of the first embodiment in shapes and relative position of the first stationary member 2 and the second stationary member 4 and other constructions of this actuator are the same as those of the actuator of the first embodiment.

In this actuator, each of magnetic pole faces of magnetic pole portions of the first stationary member 2 and the second stationary member 4 is formed into a circular curved surface so as to confront the cylindrical magnetic pole face of the driving force generator 6b of the movable member 6 via a predetermined gap. In addition, the magnetic pole portions of the second stationary member 4 are provided in recesses among the E-shaped magnetic pole portions of the first stationary member 2. Thus, when viewed in the axial direction as shown in FIG. 12, each of opposite end portions of the magnetic pole portions of the first stationary member 2 and each of opposite end portions of the magnetic pole portions of the second stationary member 4 form an overlap portion CP overlapping in three dimensions. Therefore, as shown in FIG. 11, a gap G is formed between each of the magnetic pole portions of the first stationary member 2 and each of the magnetic pole portions of the second stationary member 4.

By the above described arrangement, since each of the first stationary member 2 and the second stationary member 4 secures a space for increasing an area for confronting the movable member 6, the area for confrontation between each of the first stationary member 2 and the second stationary member 4 and the movable member 6 can be increased, so that a large force can be applied to the movable member 6. Meanwhile, by providing the gap G, magnetic reluctance of a magnetic path WC which does not contribute to application of a force to the movable member 6 as shown by the arrow in FIG. 12 proceeding in the order of an N-pole of the first stationary member 2, the gap G, the second stationary member 4, the gap G and an S-pole of the first stationary member 2 in the case of, for example, the axial direction is increased so as to reduce magnetic flux flowing through the magnetic path WC, so that a large force can be applied to the movable member 6. Here, a width of the gap G is designed in view of a width of the predetermined gap between the driving force generator 6b of the movable member 6 and each of the first stationary member 2 and the second stationary member 4, etc.

In the second embodiment referred to above, since the magnetic pole portions of each of the first stationary member 2 and the second stationary member 4 secure the space used as the area for confronting the movable member 6, the area for confrontation between each of the first stationary member 2 and the second stationary member 4 and the movable member 6 can be increased. Thus, since magnetic reluctance of the magnetic path between the first stationary member 2 and the second stationary member 4 increases, the magnetic flux which does not contribute to application of the force to the movable member 6 can be reduced. Therefore, a large force can be applied to the movable member 6 in the axial direction and in the rotational direction.

(Third Embodiment)

Figure 13:
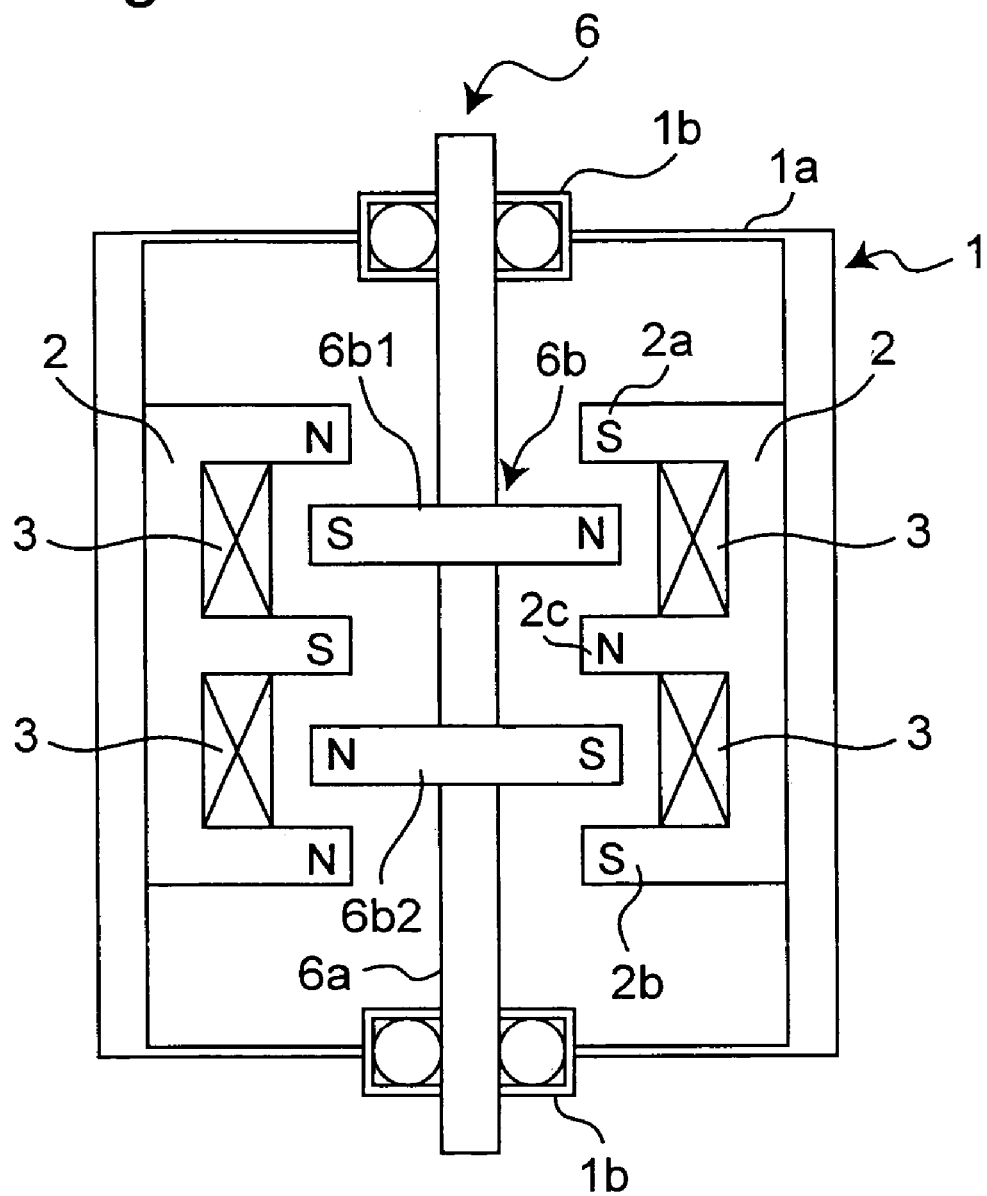
FIG. 13 is a sectional view corresponding to FIG. 2, showing an actuator according to a third embodiment of the present invention.

Then, FIG. 13 shows an actuator according to a third embodiment of the present invention. This actuator is different from the actuator of the first embodiment in shape of the movable member 6 and relative position of the movable member 6 and the first stationary member 2 and other constructions of this actuator are the same as those of the actuator of the first embodiment.

Each of the magnets 6b1 and 6b2 forming the driving force generator 6b of the movable member 6 is a cylindrical magnet having a thickness smaller than an axial width of the recesses among the E-shaped magnetic pole portions 2a to 2c of the first stationary member 2 and a diameter of the cylindrical magnet is formed larger than a distance between the corresponding magnetic pole portions of a pair of the first stationary members 2 such that the cylindrical magnet projects into each of the recesses among the magnetic pole portions 2a to 2c of the first stationary member 2. Hence, motion of the movable member 6 in the axial direction is restricted within the above recesses of the first stationary member 2. Meanwhile, radial end portions of the magnets 6b1 and 6b2 of the movable member 6 are rotated so as to traverse the recesses of the first stationary member 2. Thus, since an area in which the magnetic pole portions of the magnets 6b1 and 6b2 of the movable member 6 confront the magnetic pole portions 2a to 2c of the first stationary member 2 in the axial direction can be made large, the movable member 6 can be moved in the axial direction with great force.

(Fourth Embodiment)

Figure 14:
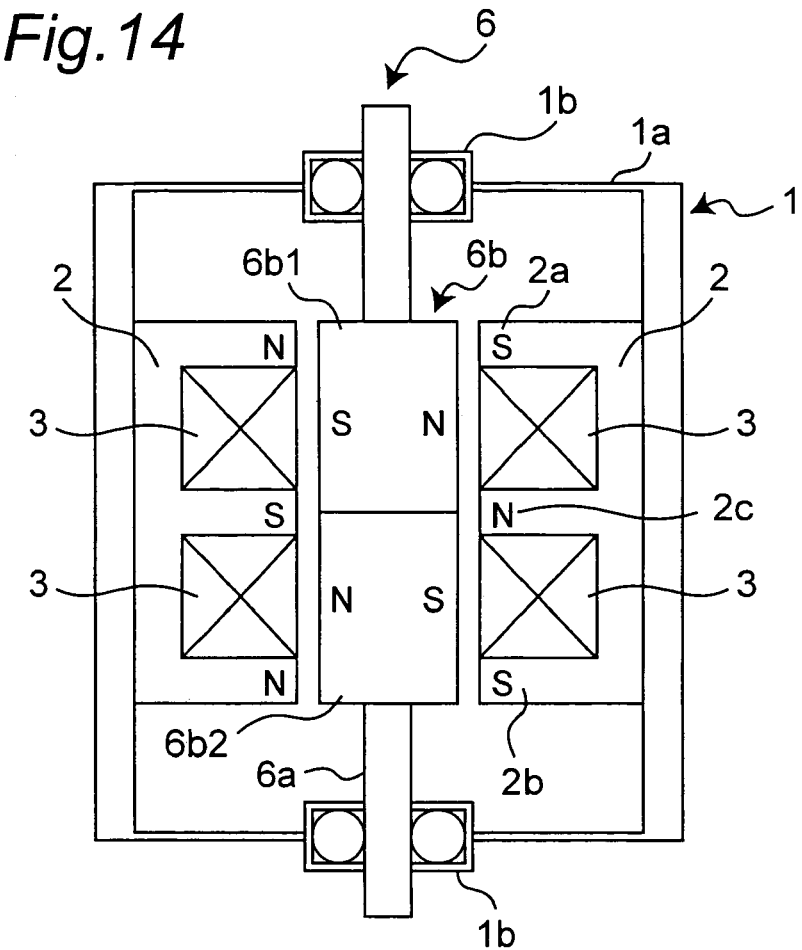
FIG. 14 is a sectional view corresponding to FIG. 2, showing an actuator according to a fourth embodiment of the present invention.
Figure 15:
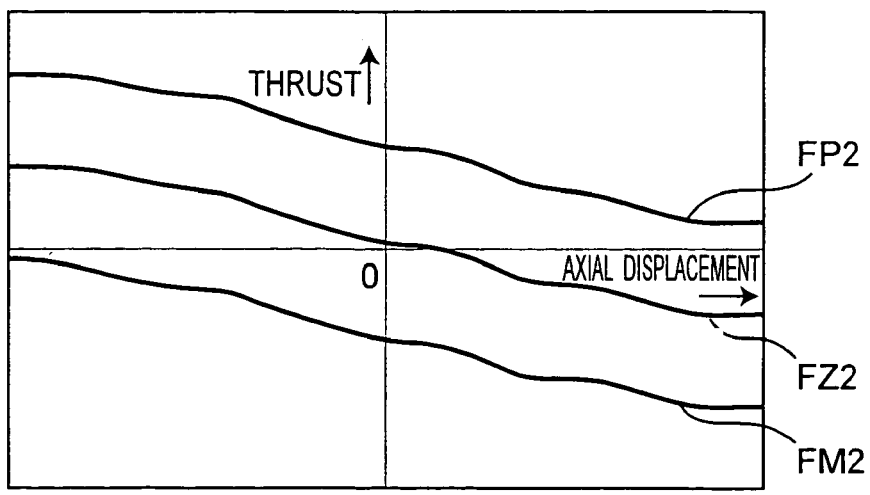
FIG. 15 is a characteristic diagram showing relation between axial displacement and thrust in the actuator of FIG. 14.

Then, FIGS. 14 and 15 show an actuator according to a fourth embodiment of the present invention. This actuator is different from the actuator of the first embodiment in shapes of the magnets 6b1 and 6b2 of the movable member 6 and other constructions of this actuator are the same as those of the actuator of the first embodiment.

As shown in FIG. 14, the magnets 6b1 and 6b2 of the movable member 6 are cylindrically formed into an identical size such that not only opposed end faces of the magnets 6b1 and 6b2 are brought into contact with each other in the axial direction but the other end faces of the magnets 6b1 and 6b2 opposite to the contacting opposed end faces are flush with axial opposite end faces of the first stationary member 2, respectively. The contacting opposed end faces of the magnets 6b1 and 6b2 are disposed at an axial center of the central magnetic pole portion 2c of the first stationary member 2.

By the above described arrangement, a position where the other end faces of the magnets 6b1 and 6b2 opposite to the contacting opposed end faces are flush with the axial opposite end faces of the first stationary member 2, respectively acts as a stable point. In FIG. 15, this actuator has thrust characteristics indicated by a curve FZ2, a curve FP2 and a curve FM2 when electric current does not flow through the first coil 3, electric current flows through the first coil 3 in a plus direction and electric current flows through the first coil 3 in a minus direction, respectively. Namely, if the movable member 6 is displaced in the axial direction, characteristics are such that a force for bringing the movable member 6 back in the opposite direction is generated. Therefore, since the movable member 6 is operated as if the movable member 6 were coupled with a return spring, the movable member 6 is capable of performing reciprocating motion stably.

In the fourth embodiment referred to above, the position where the other end faces of the magnets 6b1 and 6b2 of the movable member 6 opposite to the contacting opposed end faces are flush with the axial opposite end faces of the first stationary member 2, respectively acts as the stable point. Hence, as displacement of the movable member 6 in the axial direction becomes large, larger force is applied to the movable member 6 in the direction opposite to that of the displacement and thus, effect of the return spring can be gained.

Meanwhile, in the fourth embodiment, the driving force generator 6b of the movable member 6 includes the two magnets 6b1 and 6b2 held in contact with each other but the magnets 6b1 and 6b2 may also be formed by an integral part.

(Fifth Embodiment)

Figure 16A:
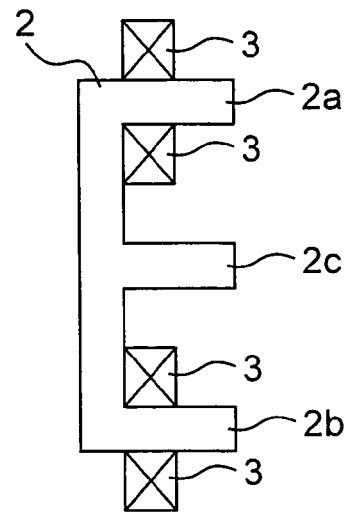
FIGS. 16A and 16B are views showing two methods of winding a first coil around a first stationary member in an actuator according to a fifth embodiment of the present invention, respectively.
Figure 16B:
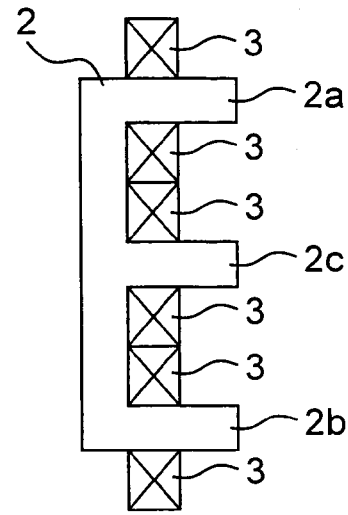

Then, FIGS. 16A and 16B show two methods of winding the first coil 3 around the first stationary member 2 in an actuator according to a fifth embodiment of the present invention. This actuator is different from the actuator of the first embodiment in winding of the first coil 3 around the first stationary member 2 and other constructions of this actuator are the same as those of the actuator of the first embodiment.

In the actuator of the first embodiment, the first coil 3 is wound around the central magnetic pole portion 2c of the first stationary member 2 as shown in FIG. 2. On the other hand, in this actuator, the first coil 3 is dividedly wound around the opposite magnetic pole portions 2a and 2b of the first stationary member 2 as shown in FIG. 16A. At this time, these first coils 3 are connected to each other such that the central magnetic pole portion 2c and the opposite magnetic pole portions 2a and 2b are excited to different magnetic poles, respectively. By winding the first coil 3 around the magnetic pole portions 2a and 2b dividedly, effect of thickness of the wound first coil 3 is less than that of the first embodiment in which the first coil 3 is wound around the single magnetic pole portion 2c, so that a space for winding the first coil 3 can be reduced. Meanwhile, as shown in FIG. 16B, the first coil 3 can also be wound around the magnetic pole portions 2a to 2c of the first stationary member 2 dividedly.

In the fifth embodiment referred to above, since the first coil 3 is dividedly wound around the opposite magnetic pole portions 2a and 2b or the magnetic pole portions 2a to 2c in the first stationary member 2, effect of thickness of the wound first coil 3 is less than that of the first embodiment in which the first coil 3 is wound around the single magnetic pole portion 2c, so that the space for winding the first coil 3 around the first stationary member 2 can reduced further.

(Sixth Embodiment)

Figure 17:
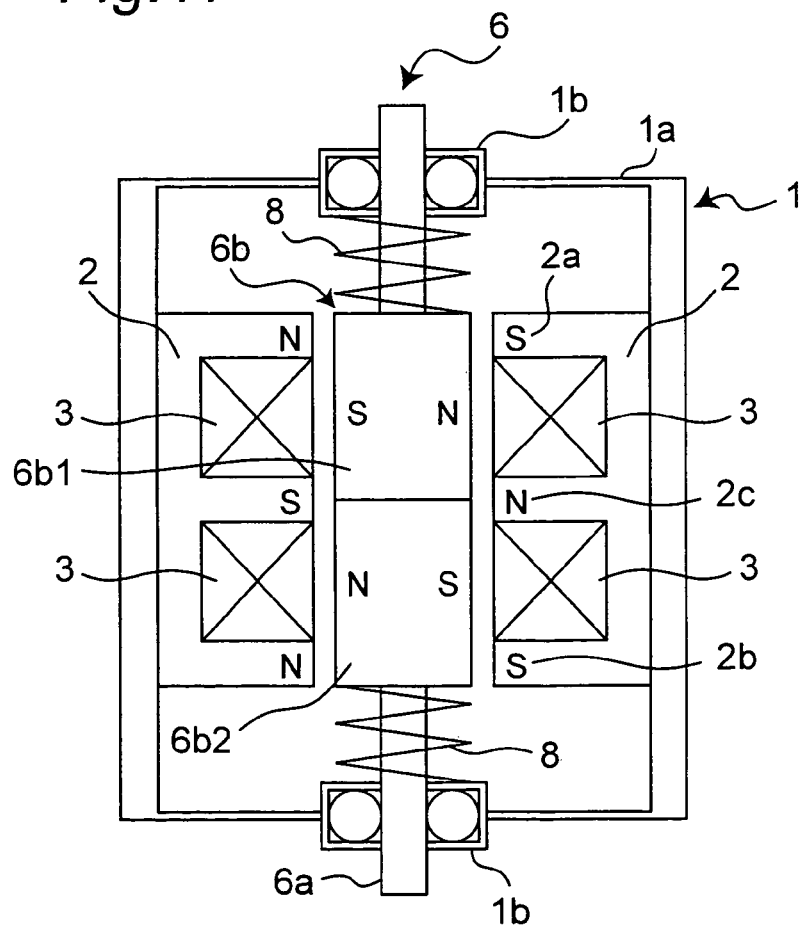
FIG. 17 is a sectional view corresponding to FIG. 2, showing an actuator according to a sixth embodiment of the present invention.

Then, FIG. 17 shows an actuator according to a sixth embodiment of the present invention. This actuator is different from the actuator of the fourth embodiment in provision of a pair of resonant springs 8 and other constructions of this actuator are the same as those of the actuator of the fourth embodiment.

Each of the resonant springs 8 is formed by a coiled spring and is provided between the casing 1 and the movable member 6 in a deflected state. Namely, one resonant spring 8 is provided between the magnet 6b1 and the corresponding bearing portion 1b and opposite ends of the one resonant spring 8 are, respectively, attached to the magnet 6b1 and the corresponding bearing portion 1b. The other resonant spring 8 is provided between the magnet 6b2 and the corresponding bearing portion 1b and opposite ends of the other resonant spring 8 are, respectively, attached to the magnet 6b2 and the corresponding bearing portion 1b. Thus, the resonant springs 8 can serve as springs not only for motion of the movable member 6 in the axial direction but for motion of the movable member 6 in the rotational direction. Hence, the resonant springs 8 have both a function of an axial resonant spring used for resonance in the axial direction and a function of a rotational resonant spring used for resonance in the rotational direction.

Therefore, when the first coil 3 is subjected to an AC voltage for excitation at a frequency close to a resonant frequency determined by a spring constant of the resonant springs 8 in the axial direction, i.e., a spring constant as the axial resonant springs and a mass of the movable member 6, the movable member 6 performs reciprocating motion in the axial direction efficiently on the basis of a resonance phenomenon. Meanwhile, when the second coil 5 is subjected to an AC voltage for excitation at a frequency close to a resonant frequency determined by a spring constant of the resonant springs 8 in the rotational direction, i.e., a spring constant as the rotational resonant springs and a moment of inertia of the movable member 6, the movable member 6 performs reciprocating motion efficiently in the rotational direction on the basis of a resonant phenomenon. Here, the frequency of the AC voltage applied to each of the first coil 3 and the second coil 5 is set to be close to the resonant frequency because an actual resonant frequency is influenced by an electric circuit for applying the AC voltage to each of the first coil 3 and the second coil 5 so as to deviate slightly from a resonant frequency determined by only a motion system.

In the sixth embodiment referred to above, each of the resonant springs 8 has both the functions of the axial resonant spring and the rotational resonant spring. Thus, when the AC voltage is applied to the first coil 3 at the frequency close to the resonant frequency determined by the mass of the movable member 6 and the spring constant of the axial resonant spring, the movable member 6 is capable of efficiently performing reciprocating motion in the axial direction at a large amplitude on the basis of the resonant phenomenon. Meanwhile, when the AC voltage is applied to the second coil 5 at the frequency close to the resonant frequency determined by the moment of inertia of the movable member 6 and the spring constant of the rotational resonant spring, the movable member 6 is capable of efficiently performing reciprocating motion in the rotational direction at a large amplitude on the basis of the resonant phenomenon. Meanwhile, since each of the resonant springs 8 acts not only as the axial resonant spring but as the rotational resonant spring, a space for providing the resonant springs 8 can be reduced.

Meanwhile, a case in which each of the resonant springs 8 has both the functions of the axial resonant spring and the rotational resonant spring has been described here. However, the sixth embodiment is not restricted to this case and thus, the axial resonant spring and the rotational resonant spring may also be provided separately. To this end, a leaf spring and a spiral spring, for example, may be used as the axial resonant spring and the rotational resonant spring, respectively. In addition, if one of a coiled spring acting as the axial resonant spring and a coiled spring acting as the rotational resonant spring is inserted into the other of the coiled springs so as to be combined therewith, a space for providing the resonant springs 8 can be reduced.

(Seventh Embodiment)

Figure 18:
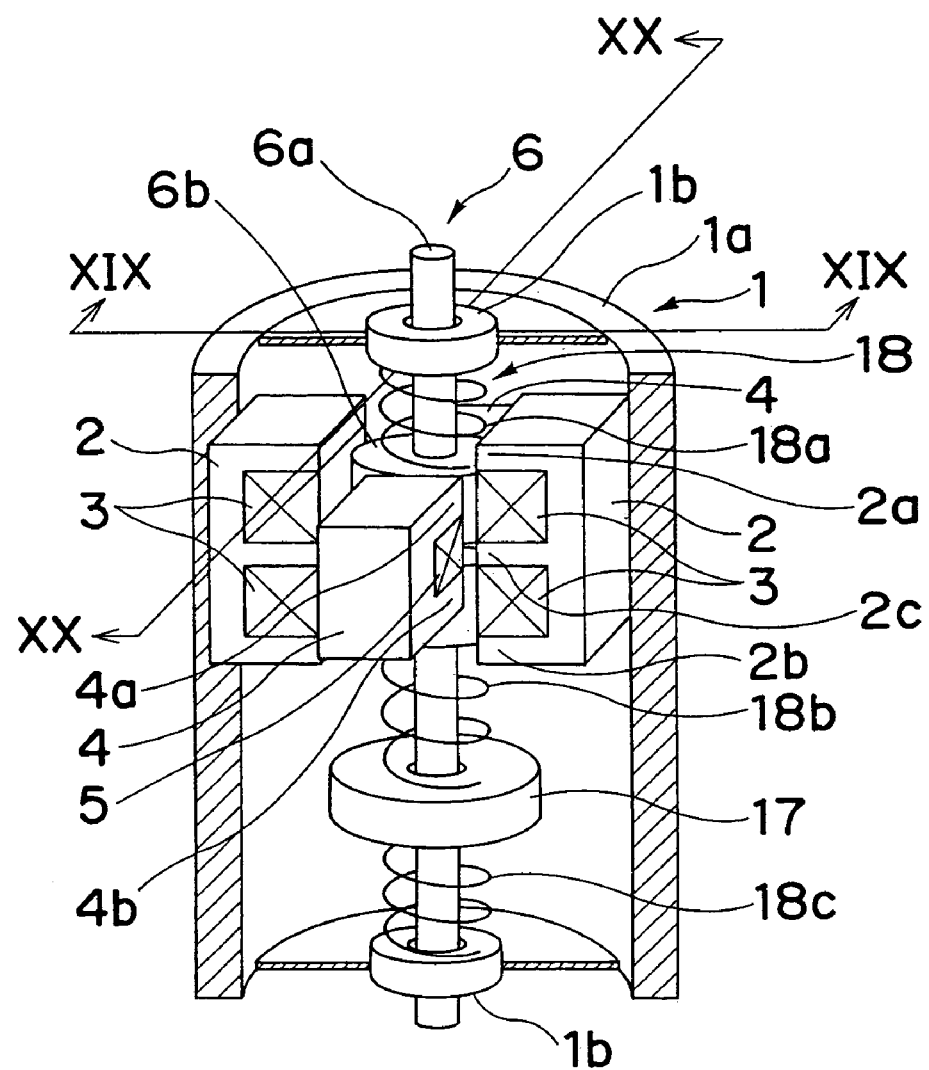
FIG. 18 is a partly sectional perspective view of an actuator according to a seventh embodiment of the present invention.
Figure 19:
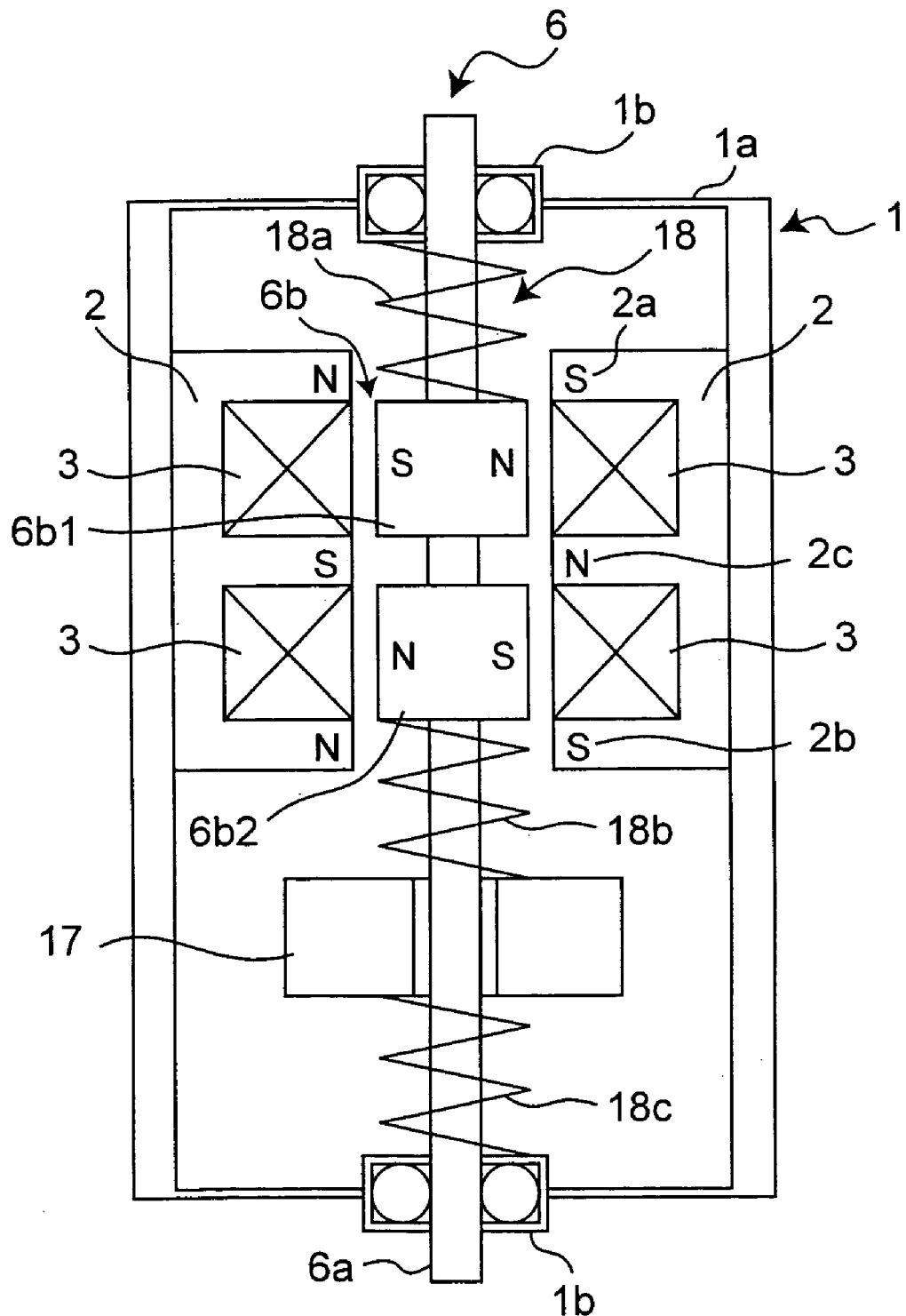
FIG. 19 is a sectional view taken along the line XIX—XIX in FIG. 18.
Figure 20:
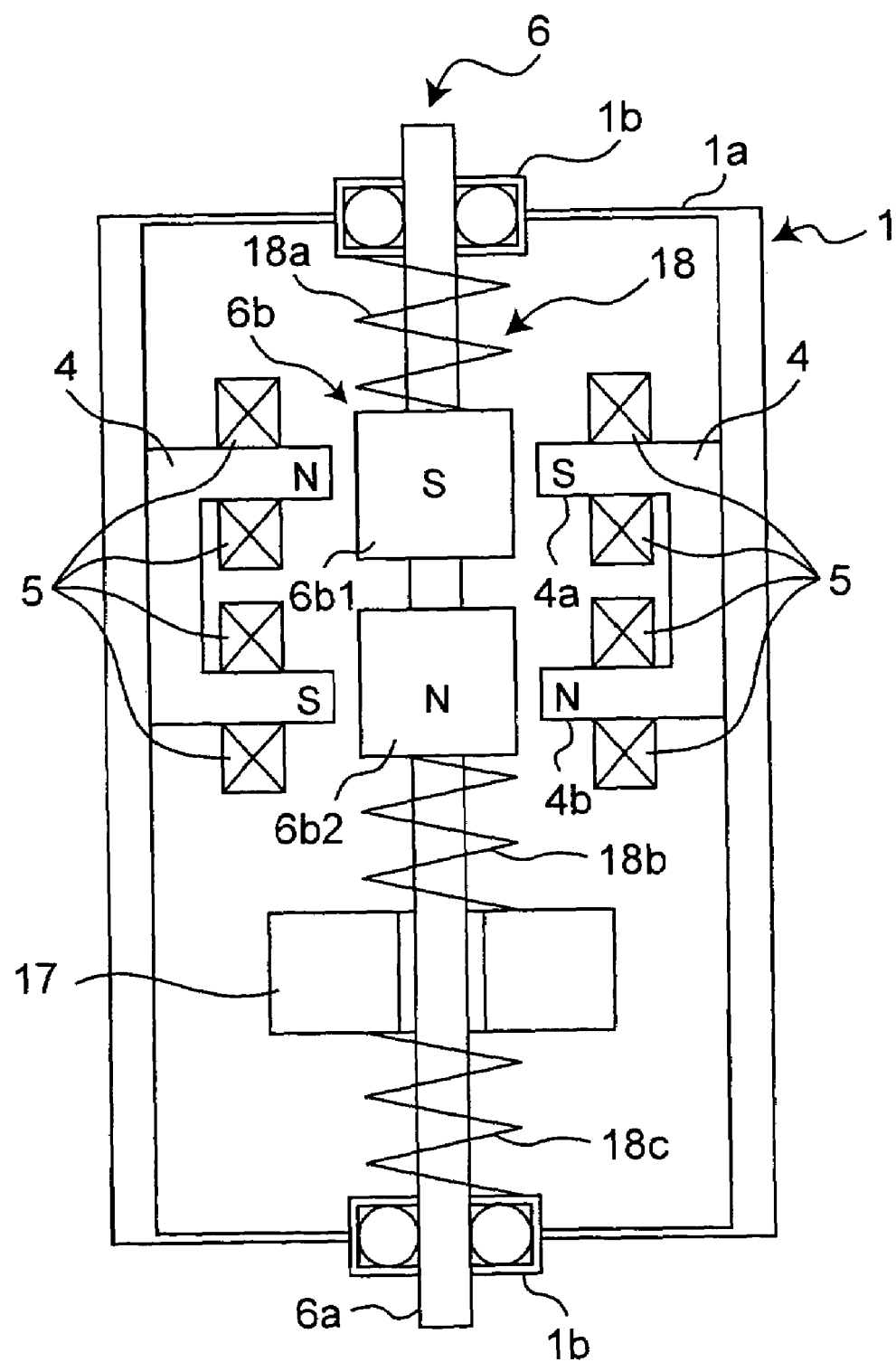
FIG. 20 is a sectional view taken along the line XX—XX in FIG. 18.
Figure 21:
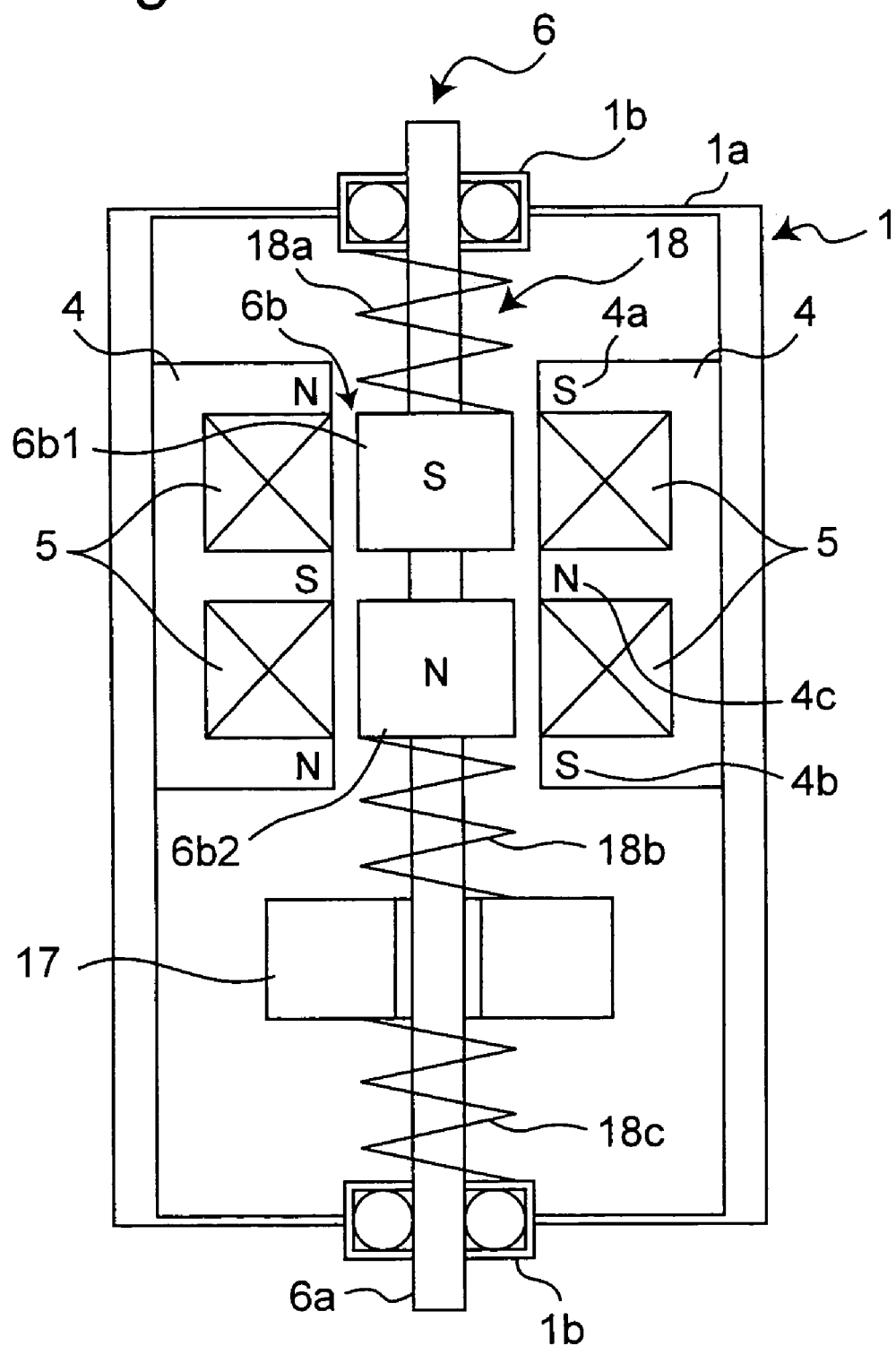
FIG. 21 is a sectional view corresponding to FIG. 20, showing an actuator which is a modification of the actuator of FIG. 18.

Then, FIGS. 18 to 20 show an actuator according to a seventh embodiment of the present invention. This actuator is different from the actuator of the first embodiment in that a further movable member 17 and a spring member 18 are provided so as to be accommodated in the casing 1. Other constructions of this actuator are the same as those of the actuator of the first embodiment. Therefore, this actuator operates substantially in the same manner as the actuator of the first embodiment. Meanwhile, in FIG. 21 showing an actuator which is a modification of the actuator of FIG. 18, the second stationary member 4 is formed into the E-shaped configuration having the three magnetic pole portions, i.e., the opposite magnetic pole portions 4$a$ and 4$b$ and the central magnetic pole portion 4$c$ in the same manner as the modification (FIG. 7) of the first embodiment.

The further movable member 17 is formed by copper, tungsten, brass or the like into a cylindrical tube having an outside diameter smaller than an inside diameter of the housing portion 1$a$ and a circular through-hole having a diameter larger than that of the shaft 6$a$ is provided at a central axis of the further movable member 17. The further movable member 17 is accommodated in the housing portion 1$a$ and is disposed between the magnet 6$b2$ of the movable member 6 and the corresponding bearing portion 1$b$ so as to be arranged in the axial direction together with the magnet 6$b2$ such that shaft 6$a$ is inserted through the through-hole. The further movable member 17 is supported between the magnet 6$b2$ and the bearing portion 1$b$ by using the spring member 18 to be described below so as to be moved in the axial direction separately from the movable member 6. A mass of the further movable member 17 is so set as to be substantially equal to that of the movable member 6.

The spring member 18 is constituted by three coiled springs deflectable in the axial direction, namely, a first spring 18$a$, a second spring 18$b$ and a third spring 18$c$. The first spring 18$a$ is provided between the magnet 6$b1$ and the corresponding bearing portion 1$b$ and opposite ends of the first spring 18$a$ are, respectively, attached to the magnet 6$b1$ and the corresponding bearing portion 1$b$. Meanwhile, the second spring 18$b$ is provided between the magnet 6$b2$ and the further movable member 17 and opposite ends of the second spring 18$b$ are, respectively, attached to the magnet 6$b2$ and the further movable member 17. Moreover, the third spring 18$c$ is provided between the further movable member 17 and the corresponding bearing portion 1$b$ and opposite ends of the third spring 18$c$ are, respectively, attached to the further movable member 17 and the corresponding bearing portion 1$b$. As a result, the spring member 18 acts as a spring also in the rotational direction.

Meanwhile, the casing 1, the movable member 6, the further movable member 17 and the spring member 18 constitute a spring resonant system which performs resonant motion in the axial direction at a resonant frequency determined by respective masses of the casing 1, the movable member 6, the further movable member 17 and the spring member 18 and respective spring constants of the first spring 18$a$, the second spring 18$b$ and the third spring 18$c$ of the spring member 18. This spring resonant system has two resonant frequencies when the spring resonant system can be approximately regarded as being in a state in which the casing 1 is fixed. At one of the resonant frequencies (hereinafter, referred to as a "primary mode resonant frequency"), the movable member 6 and the further movable member 17 are moved in the axial direction in an in-phase manner, while at the other resonant frequency (hereinafter, referred to as a "secondary mode resonant frequency"), the movable member 6 and the further movable member 17 are moved in the axial direction in an antiphase manner. Hence, if an AC voltage having a frequency close to the secondary mode resonant frequency is applied to the first coil 3, the movable member 6 and the further movable member 17 perform resonant motion in the axial direction in the antiphase manner. Therefore, by such axial resonant motion, a large axial amplitude of the movable member 6 can be obtained efficiently. Meanwhile, since the mass of the movable member 6 is substantially equal to that of the further movable member 17, inertia forces of the first movable member 6 and the further movable member 17 cancel with each other, so that it is possible to lessen vibrations of the casing 1 due to the axial inertia forces transmitted to the casing 1.

On the other hand, since the spring member 18 is the coiled spring, the spring member 18 functions as a spring in the rotational direction by fixing the opposite ends of the spring member 18. Hence, the casing 1, the movable member 6, the further movable member 17 and the spring member 18 constitute a spring resonant system which performs resonant motion in the radial direction at a resonant frequency determined by respective moments of inertia of the casing 1, the movable member 6, the further movable member 17 and the spring member 18 and respective spring constants of the first spring 18$a$, the second spring 18$b$ and the third spring 18$c$ of the spring member 18 in the rotational direction. Therefore, if an AC voltage having a frequency close to this resonant frequency is applied to the second coil 5, a large amplitude of the movable member 6 in the rotational direction can be obtained efficiently by the resonant motion in the rotational direction.

In the seventh embodiment, the frequency of the AC voltage applied to each of the first coil 3 and the second coil 5 is set to be close to the resonant frequency in order to perform resonant motion of the movable member 6 in the axial direction and in the rotational direction because an actual resonant frequency is influenced by an electric circuit for applying the AC voltage to each of the first coil 3 and the second coil 5 so as to deviate slightly from a resonant frequency determined by only a motion system.

In the above mentioned actuator according to the seventh embodiment of the present invention, since the spring resonant system is constituted by the movable member 6, the further movable member 17, the casing 1 and the spring member 18 deflectable among these members in the axial direction, the magnetic path passing through the first stationary member 2 is excited by the first coil 3 so as to impart to the movable member 6 the force oriented in the axial direction such that resonant motion in the axial direction is performed and the magnetic path passing through the second stationary member 4 is excited by the second coil 5 so as to impart to the movable member 6 the force oriented in the rotational direction such that resonant motion in the rotational direction is performed, motion of the movable member 6 in the axial direction and motion of the movable member 6 in the rotational direction can be controlled independently of each other. Meanwhile, in the resonant motion in the axial direction, since the movable member 6 and the further movable member 17 can be, respectively, moved oppositely in the axial direction, it is possible to lessen vibrations of the casing 1 due to the axial inertia force transmitted to the casing 1. Consequently, it is possible to upgrade the degree of freedom of operational control of the actuator in which the movable member 6 can be moved in the two directions of the axial direction and the rotational direction without using the motion direction converting mechanism.

Meanwhile, since the first stationary member 2 and the second stationary member 4 impart to the movable member 6 the force oriented in the axial direction and the force oriented in the rotational direction, respectively but the further movable member 17 does not undergo the forces directly from the first stationary member 2 and the second stationary member 4, design of the spring resonant system is facilitated.

Furthermore, in the seventh embodiment, a case in which the movable member 6 is subjected to the force oriented in the axial direction from the first stationary member 2 and the force oriented in the rotational direction from the second stationary member 4 has been described. However, the seventh embodiment is not restricted to this case. Since the force oriented in the axial direction and the force oriented in the rotational direction are transmitted from the movable member 6 to the further movable member 17 through the spring member 18, the further movable member 17 may undergo the force oriented in the axial direction from the first stationary member 2 and the force oriented in the rotational direction from the second stationary member 4 by switching magnetic structures of the movable member 6 and the further movable member 17.

(Eighth Embodiment)

Figure 22:
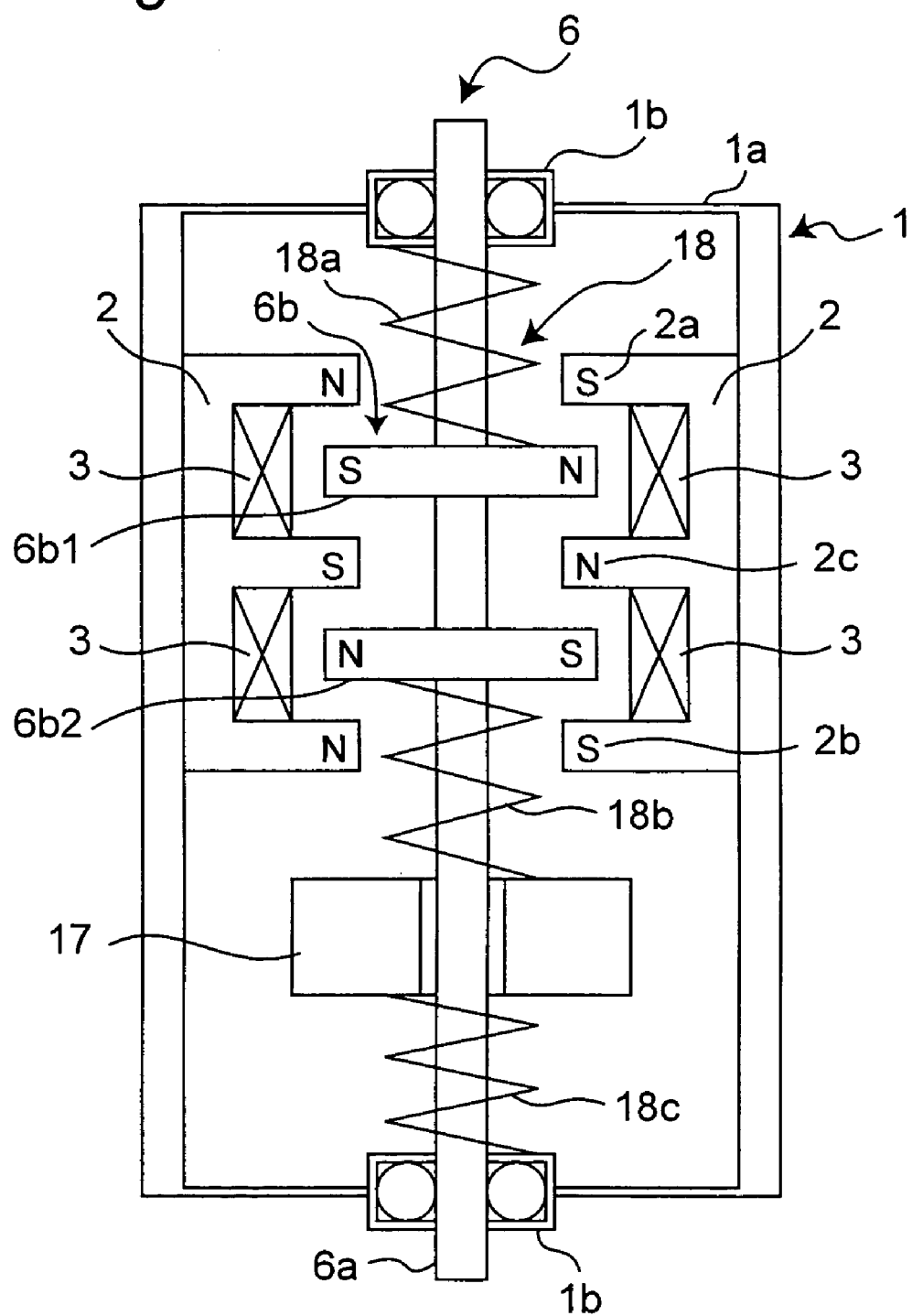
FIG. 22 is a sectional view corresponding to FIG. 19, showing an actuator according to an eighth embodiment of the present invention.

Then, FIG. 22 shows an actuator according to an eighth embodiment of the present invention. This actuator is different from the actuator of the seventh embodiment in shape of the movable member 6 and relative position of the movable member 6 and the first stationary member 2 and other constructions of this actuator are the same as those of the actuator of the seventh embodiment. More specifically, this actuator is obtained by applying the shape of the movable member 6 and the relative position of the movable member 6 and the first stationary member 2 in the actuator of the third embodiment of FIG. 13 to the actuator of the seventh embodiment.

Therefore, in the same manner as the third embodiment, each of the magnets 6b1 and 6b2 forming the driving force generator 6b of the movable member 6 is a cylindrical magnet having a thickness smaller than an axial width of the recesses among the E-shaped magnetic pole portions 2a to 2c of the first stationary member 2 and a diameter of the cylindrical magnet is formed larger than a distance between the corresponding magnetic pole portions of a pair of the first stationary members 2 such that the cylindrical magnet projects into each of the recesses among the magnetic pole portions 2a to 2c of the first stationary member 2. Hence, radial end portions of the magnets 6b1 and 6b2 of the movable member 6 are rotated so as to traverse the recesses of the first stationary member 2. Thus, since an area in which the magnetic pole portions of the magnets 6b1 and 6b2 of the movable member 6 confront the magnetic pole portions 2a to 2c of the first stationary member 6 in the axial direction can be made large, the movable member 6 can be moved in the axial direction with great force.

(Ninth Embodiment)

Figure 23:
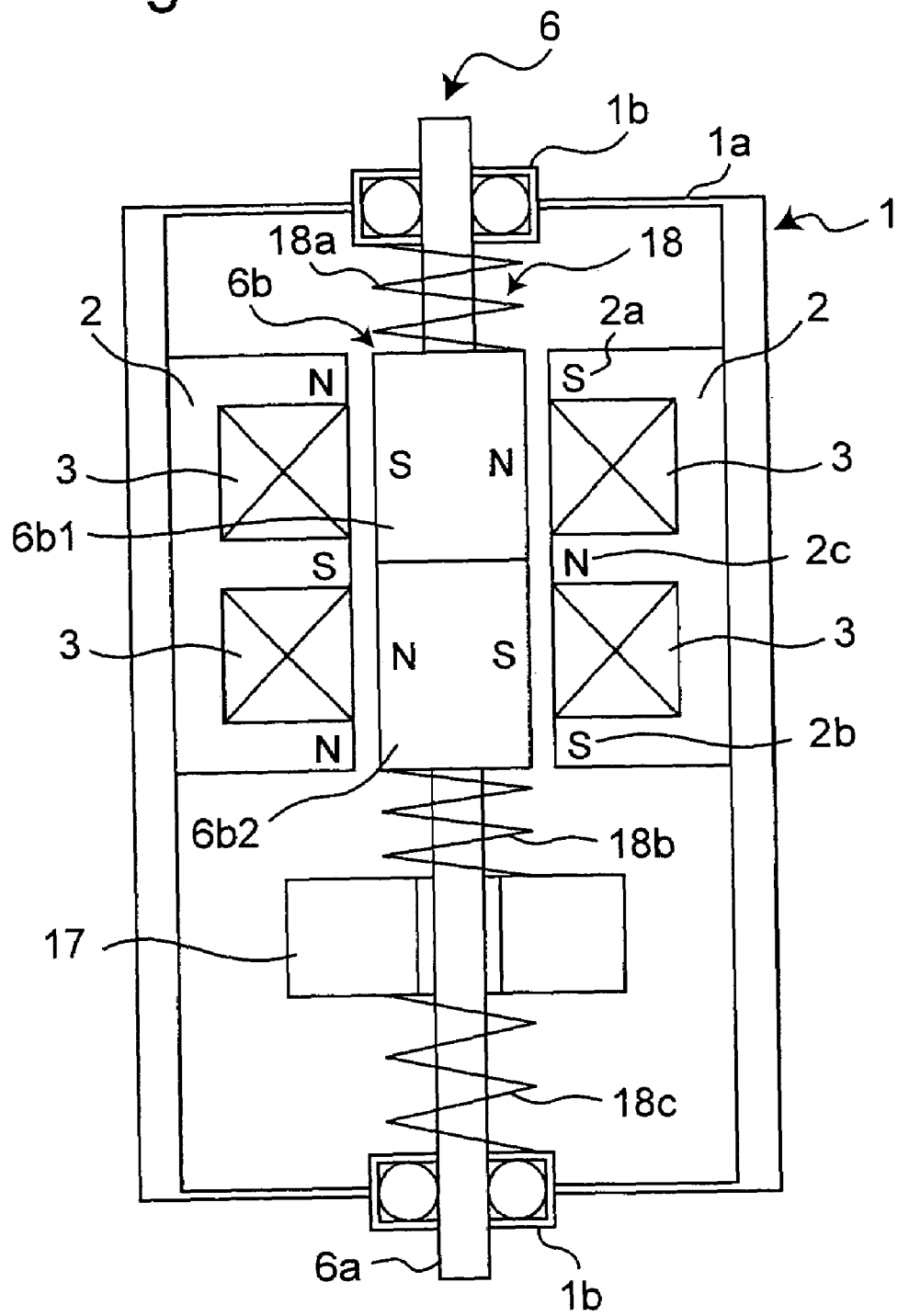
FIG. 23 is a sectional view corresponding to FIG. 19, showing an actuator according to a ninth embodiment of the present invention.

Then, FIG. 23 shows an actuator according to a ninth embodiment of the present invention. This actuator is different from the actuator of the seventh embodiment in shape of the magnets 6b1 and 6b2 of the movable member 6 and other constructions of this actuator are the same as those of the actuator of the seventh embodiment. More specifically, this actuator is obtained by applying the shape of the magnets 6b1 and 6b2 of the movable member 6 in the actuator of the fourth embodiment of FIG. 14 to the actuator of the seventh embodiment.

Therefore, in the same manner as the fourth embodiment, the magnets 6b1 and 6b2 of the movable member 6 are cylindrically formed into an identical size such that not only opposed end faces of the magnets 6b1 and 6b2 are brought into contact with each other in the axial direction but the other end faces of the magnets 6b1 and 6b2 opposite to the contacting opposed end faces are flush with axial opposite end faces of the first stationary member 2, respectively. The contacting opposed end faces of the magnets 6b1 and 6b2 are disposed at an axial center of the central magnetic pole portion 2c of the first stationary member 2.

By the above described arrangement, since a position where the other end faces of the magnets 6b1 and 6b2 opposite to the contacting opposed end faces are flush with the axial opposite end faces of the first stationary member 2, respectively acts as a stable point and the movable member 6 is operated as if the movable member 6 were coupled with a return spring in the same manner as the fourth embodiment, a spring having a small spring constant can be used as the spring member 18.

In the ninth embodiment referred to above, the position where the other end faces of the magnets 6b1 and 6b2 of the movable member 6 opposite to the contacting opposed end faces are flush with the axial opposite end faces of the first stationary member 2, respectively acts as the stable point. Hence, as displacement of the movable member 6 in the axial direction becomes large, larger force is applied to the movable member 6 in the direction opposite to that of the displacement and thus, effect of the return spring can be gained.

Meanwhile, in the ninth embodiment, the driving force generator 6b of the movable member 6 includes the two magnets 6b1 and 6b2 held in contact with each other but the magnets 6b1 and 6b2 may also be formed by an integral part having different magnetization directions at its two locations.

(Tenth Embodiment)

Figure 24:
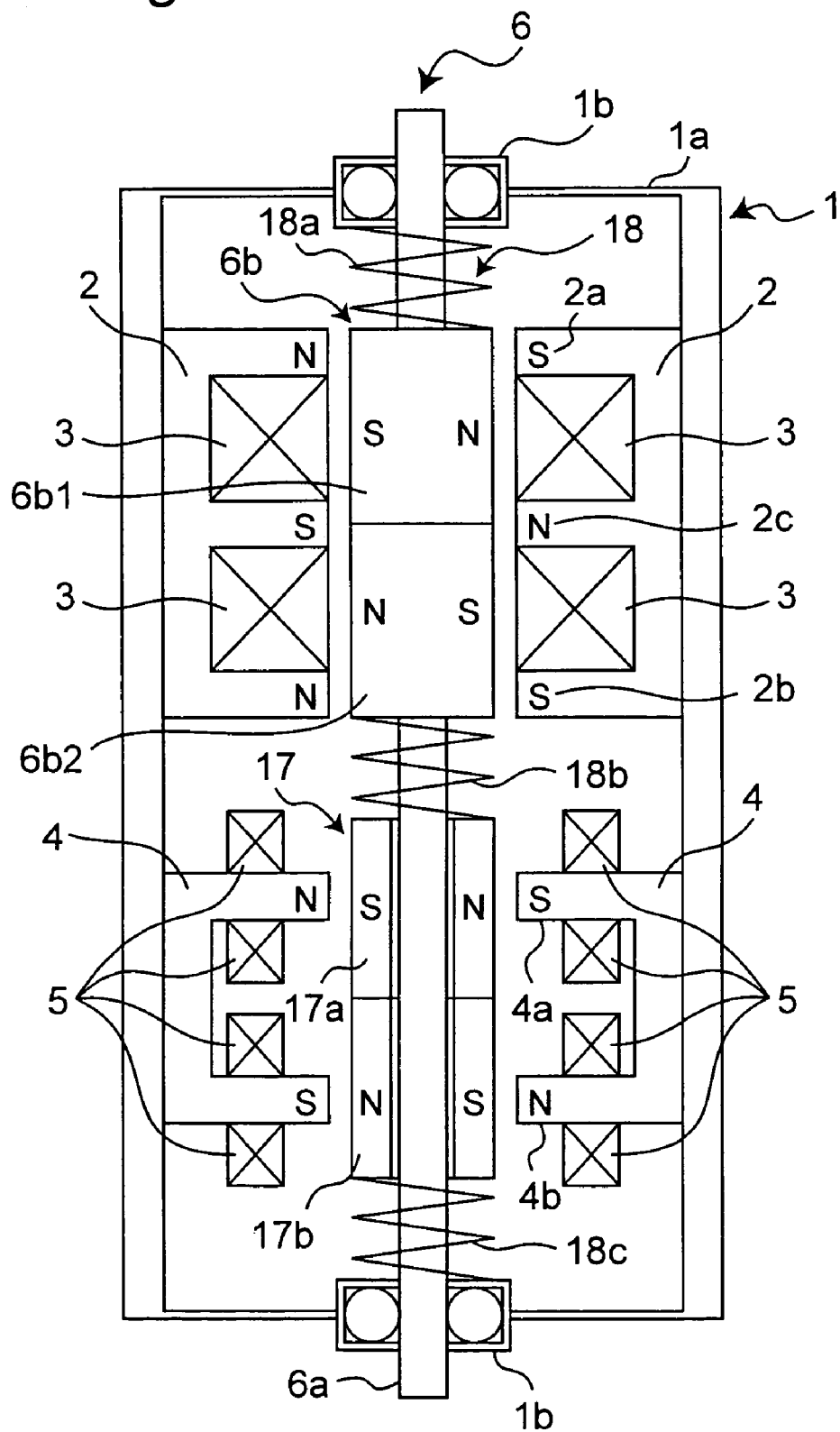
FIG. 24 is a sectional view corresponding to FIG. 19, showing an actuator according to a tenth embodiment of the present invention.
Figure 25:
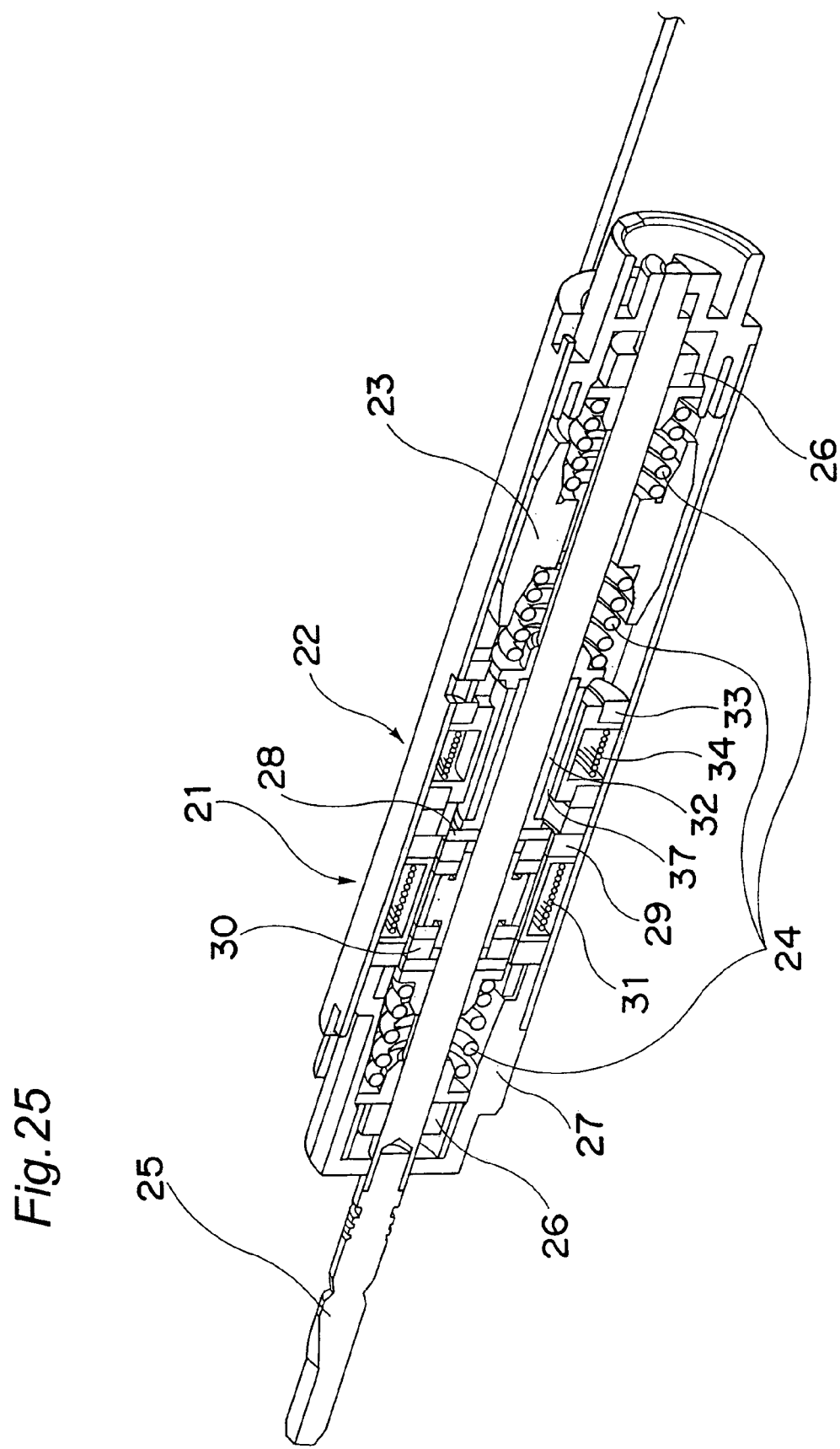
FIG. 25 is a longitudinal sectional view of an actuator according to an eleventh embodiment of the present invention.

FIG. 24 shows an actuator according to a tenth embodiment of the present invention. This actuator is different from the actuator of the ninth embodiment in that the movable member 6 does not undergo force from the second stationary member 4 but the further movable member 17 undergoes force from the second stationary member 4. Other constructions of this actuator are the same as those of the actuator of the ninth embodiment.

The further movable member 17 includes two magnets 17a and 17b held in contact with each other in the same manner as the movable member 6 and a circular through-hole having a diameter larger than that of the shaft 6a is formed at a central axis of each of the magnets 17a and 17b. The magnets 17a and 17b are accommodated in the housing portion 1a so as to be arranged between the magnet 6b2 of the movable member 6 and the corresponding bearing portion. 1b in the axial direction such that the shaft 6a is inserted through the through-hole via a bearing. The magnets 17a and 17b are supported between the magnet 6b2 and the corresponding bearing portion 1b by the second spring 18b and the third spring 18c of the spring member 18. A total mass of the magnets. 17a and 17b of the further movable member 17 is so set as to be substantially equal to the mass of the movable member 6. Meanwhile, the second stationary member 4 has the same shape as that of the second stationary member 4 of the actuator of the seventh embodiment in FIG. 20 and confronts the further movable member 17.

In the tenth embodiment of the above described arrangement, since magnetic flux from the first stationary member 2, which is contributory to force oriented in the axial direction and magnetic flux from the second stationary member 4, which is contributory to force oriented in the rotational direction can be handled separately, design of the spring resonant system is facilitated.

Meanwhile, in the tenth embodiment, since the force oriented in the axial direction is applied to the movable member 6 from the first stationary member 2 and the force oriented in the rotational direction is applied to the further movable member 6 from the second stationary member 4, a magnetic path for generating the force oriented in the axial direction and a magnetic path for generating the force oriented in the rotational direction are separated from each other are separated from each other, thereby resulting in facilitation of design of the magnetic circuit.

Moreover, in the tenth embodiment, an arrangement in which the force oriented in the axial direction is applied to the movable member 6 and the force oriented in the rotational direction is applied to the further movable member 17 has been described but may also be replaced by a reverse arrangement in which the force oriented in the rotational direction is applied to the movable member 6 and the force oriented in the axial direction is applied to the further movable member 17.

On the other hand, in the seventh and tenth embodiments, the mass of the movable member 6 is so set as to be substantially equal to that of the further movable member 17. However, the seventh and tenth embodiments are not restricted to this setting. For example, when the mass of the movable member 6 and the mass of the further movable member 17 are adjusted unequally to each other, such effects are gained that vibrations in the axial directions can be lessened and amplitude of reciprocating motion can be adjusted.

Meanwhile, in the same manner as the actuator of the first embodiment, it is needless to say that the shapes and the relative position of the first stationary member 2 and the second stationary member 4 in the actuator of the second embodiment in FIGS. 11 and 12 and the methods of winding the first coil 3 around the first stationary member 2 in the actuator of the fifth embodiment in FIGS. 16A and 16B can be applied to the actuator of the seventh embodiment.

Furthermore, in the above mentioned first to tenth embodiments, an arrangement in which each of the magnets 6b1 and 6b2 of the driving force generator 6b of the movable member 6 is symmetrical with respect to the rotational axis, a pair of the first stationary members 2 disposed symmetrically with respect to the rotational axis are excited in an antiphase manner and a pair of the second stationary members 4 disposed symmetrically with respect to the rotational axis are excited in an antiphase manner. However, since the first to tenth embodiments are not restricted to this arrangement, the single first stationary member 2 and the single second stationary member 4 may also be provided such that only one of the opposite magnetic poles of each of the magnets 6b1 and 6b2 is used.

In addition, in the above described first to tenth embodiments, an arrangement in which the driving force generator 6b of the movable member 6 includes the two magnets 6b1 and 6b2 has been described but the driving force generator 6b may also be formed by a single magnet. In this case, when, for example, the first stationary member 2 has one magnetic portion or two C-shaped magnetic portions and the second stationary member 4 has one magnetic portion, the movable member 6 can be moved in the axial direction and in the rotational direction.

(Eleventh Embodiment)

FIGS. 25 to 31 show an actuator according to an eleventh embodiment of the present invention. This actuator includes an axial actuator 21 used for drive in the axial direction, a rotary actuator 22 used for drive in the rotational direction and a dynamic vibration absorber 23 for lessening vibrations in the axial actuator 21. The axial actuator 21, the rotary actuator 22 and the dynamic vibration absorber 23 are mounted on a shaft 25 so as to be accommodated in a casing 27. The shaft 25 is, in turn, supported by a pair of bearings 26 provided at opposite end portions of the casing 27, respectively. Three springs 24 are, respectively, provided between one of the bearings 26 and the actual actuator 21, between the rotary actuator 22 and the dynamic vibration absorber 23 and between the dynamic vibration absorber 23 and the other bearing 26.

Figure 26:
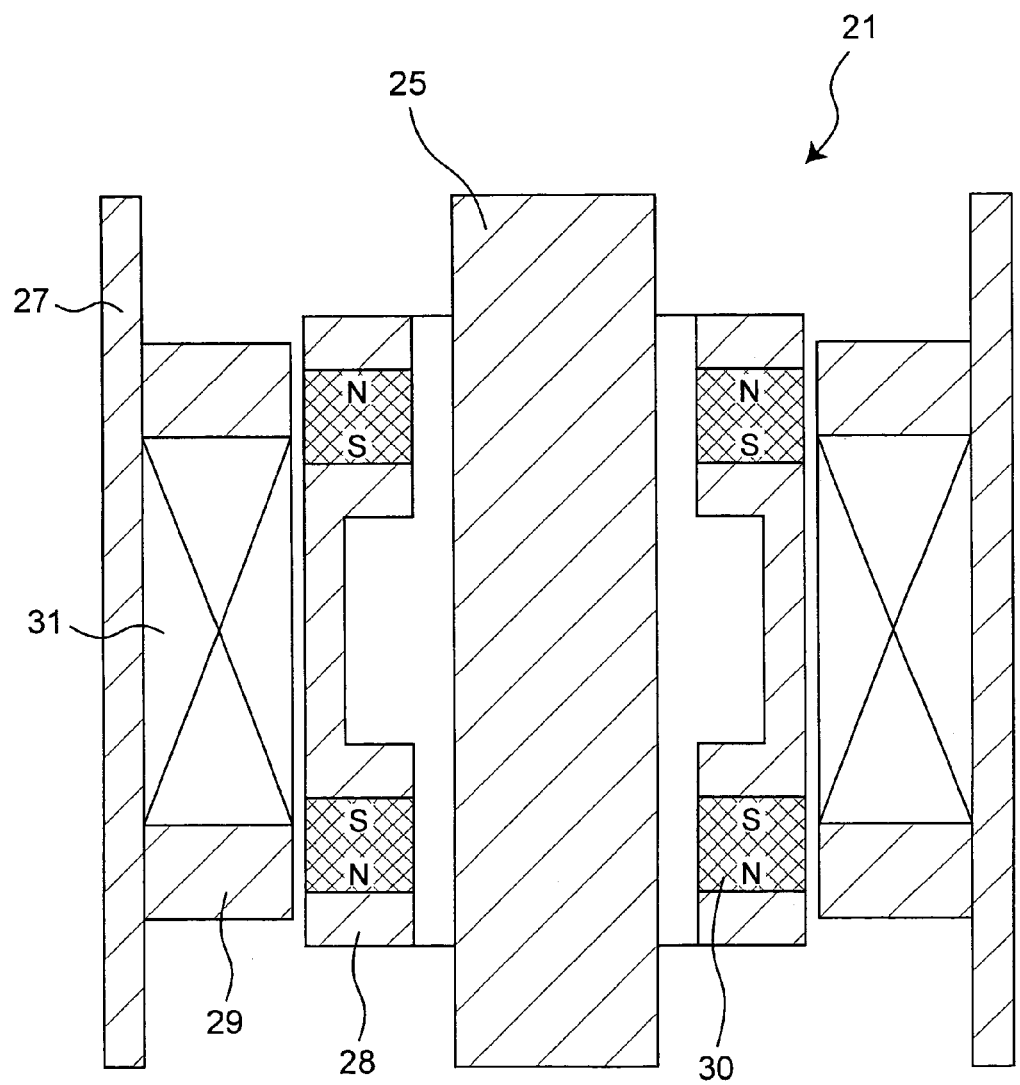
FIG. 26 is a sectional view showing magnetic structure of an axial actuator employed in the actuator of FIG. 25.

FIG. 26 shows magnetic structure of the axial actuator 21. In FIG. 26, hatching portions indicate a magnet or magnetic material and blank sections indicate nonmagnetic material. In FIG. 26, the shaft 25 is depicted as magnetic material but is not necessarily required to be made of the magnetic material. The axial actuator 21 includes a stationary member 29 having a coil 31 wound therearound and a movable member 28 which has a pair of magnets 30 and is secured to the shaft 25. Each of the magnets 30 is magnetized in an upward and downward direction in FIG. 26.

Figure 27:
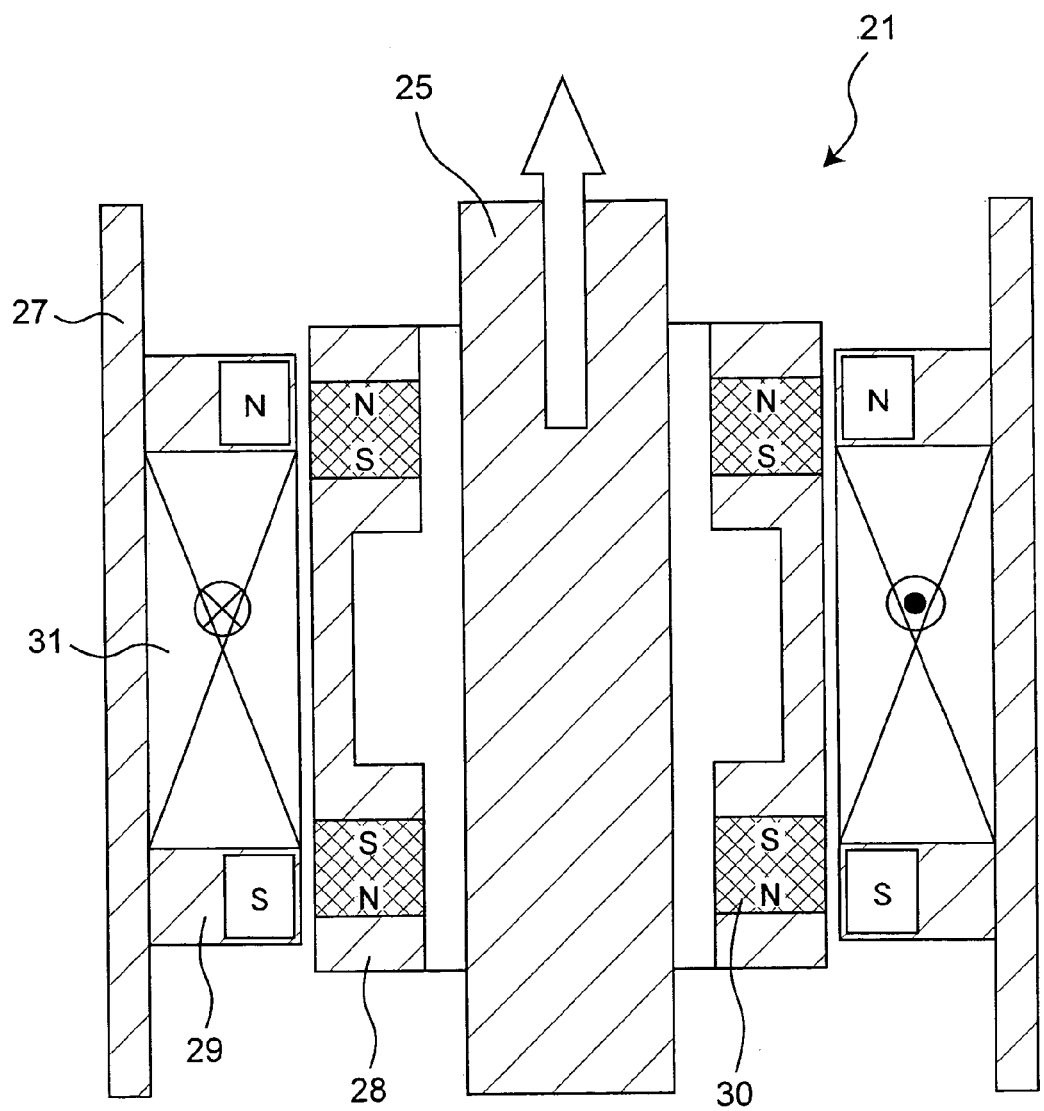
FIG. 27 is a view explanatory of operating principle of the axial actuator of FIG. 26.

FIG. 27 shows operating principle of the axial actuator 21. As shown in FIG. 27, when electric current is inputted to the coil 31, magnetic poles are produced in the stationary member 29 and the movable member 28 and thus, the movable member 28 is displaced upwardly as shown by the arrow. By reversing the magnetization direction based on the electric current inputted to the coil 31, the movable member 28 can be driven so as to be displaced in the opposite direction, i.e., downwardly in FIG. 27. An AC voltage of sine wave or cosine wave is applied to the coil 31.

Figure 28:
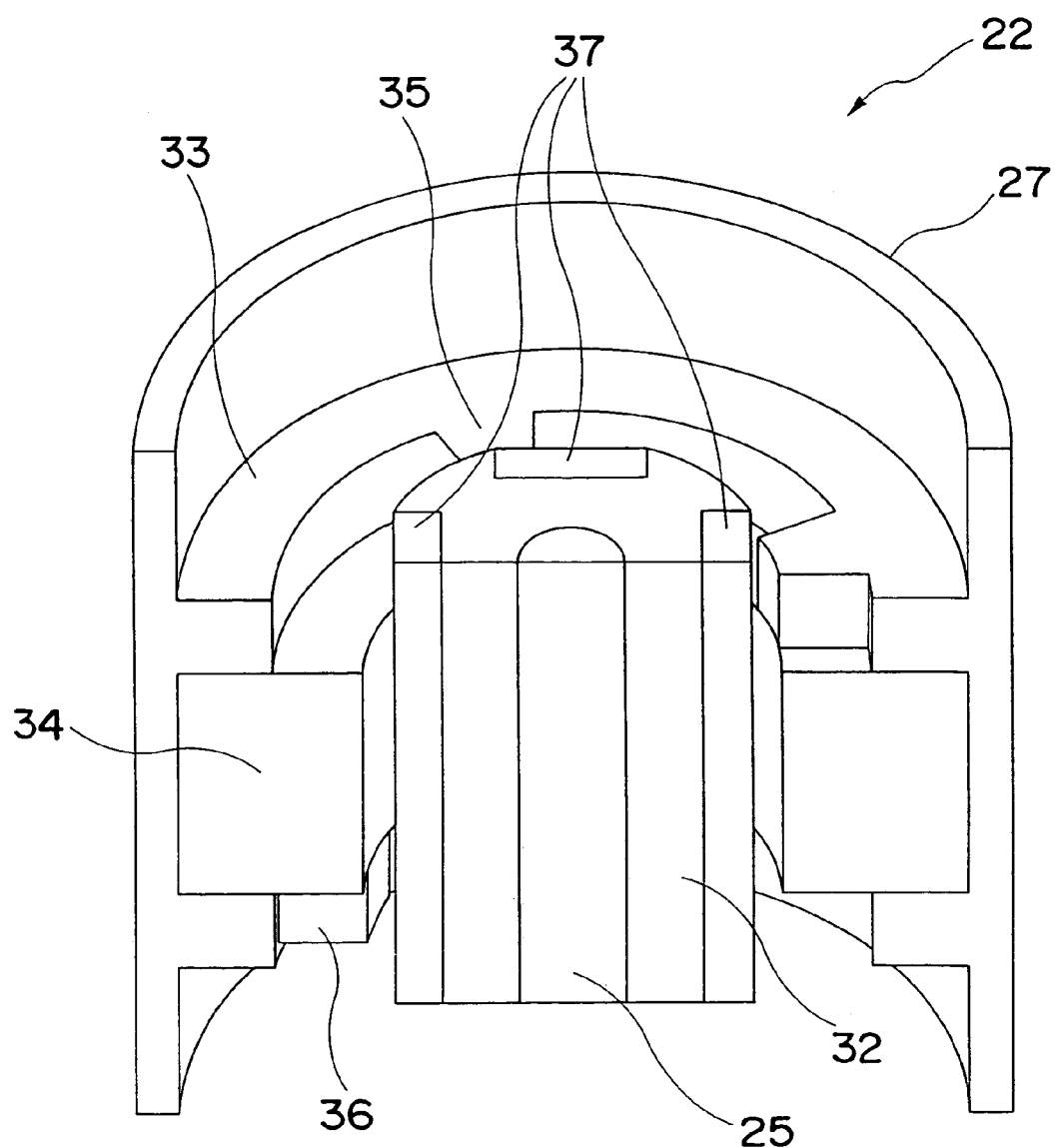
FIG. 28 is a cutaway perspective view showing magnetic structure of a rotary actuator employed in the actuator of FIG. 25.
Figure 29A:
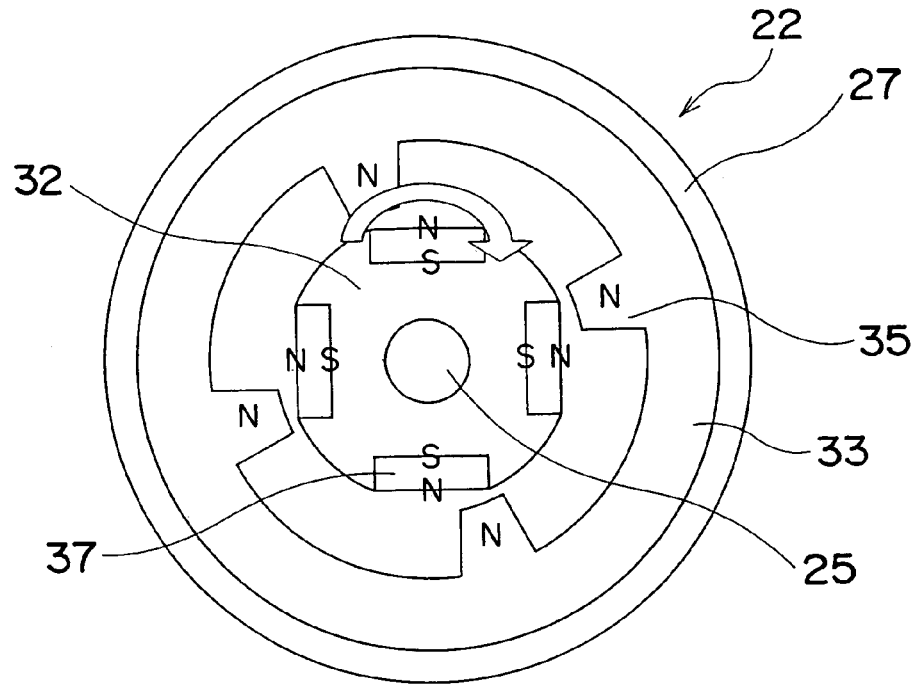
FIGS. 29A and 29B are views showing magnetization states of an upper magnetic pole and a lower magnetic pole of a stationary member in the rotary actuator of FIG. 28, respectively.
Figure 29B:
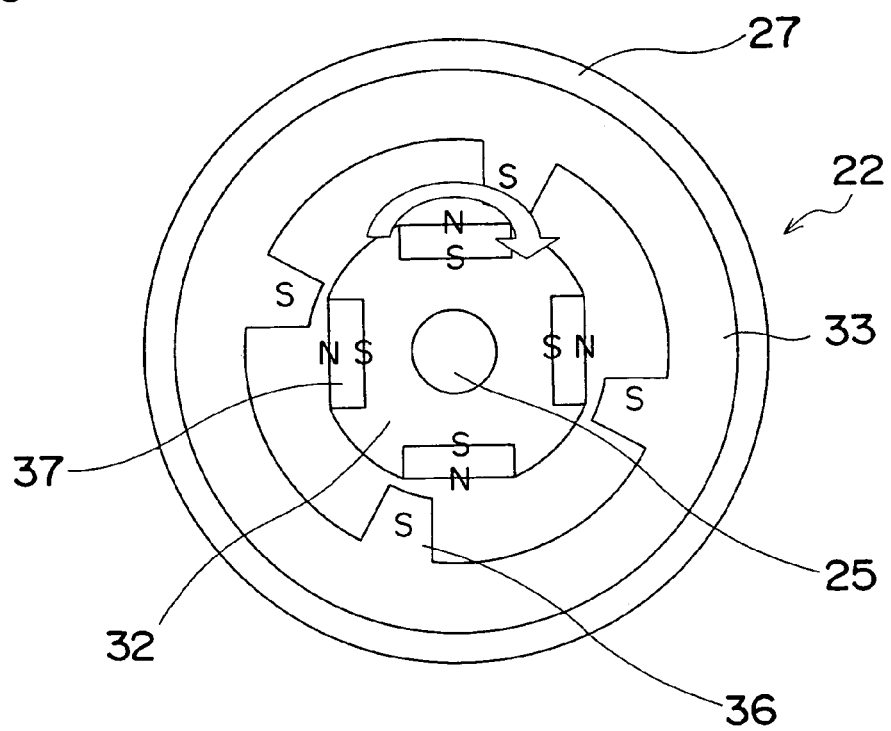
Figure 30:
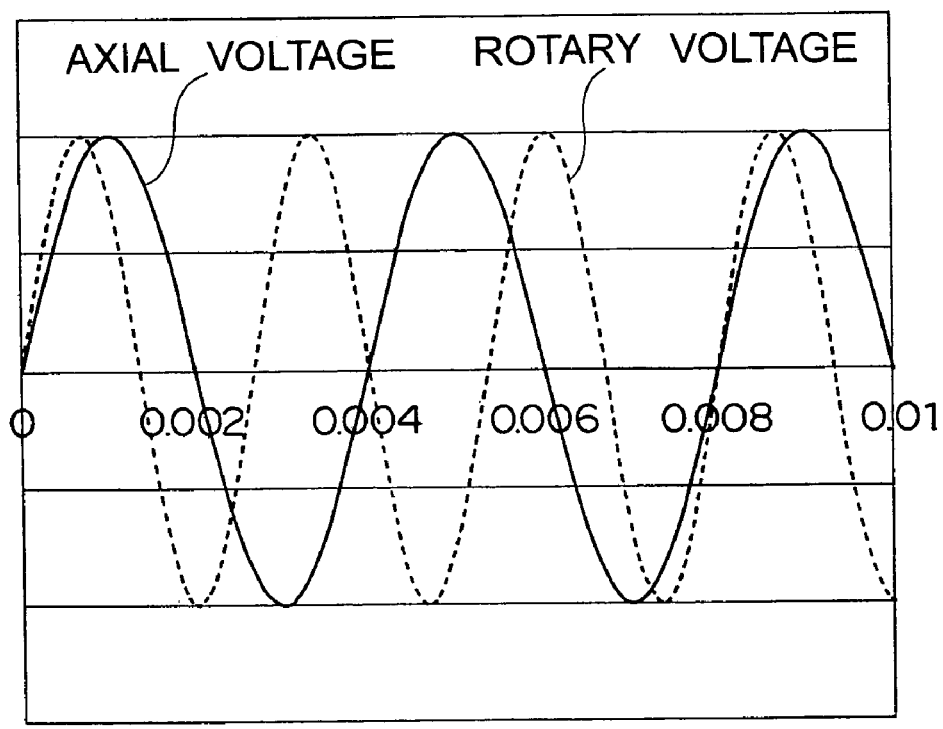
FIG. 30 is a waveform diagram of a voltage for operating the actuator of FIG. 25.

FIG. 28 show magnetic structure of the rotary actuator 22. The rotary actuator 22 includes a stationary member 33 having a coil 34 wound therearound and a movable member 32 which is provided, at its outer periphery, with four magnets 37 as shown in FIG. 29A and is secured to the shaft 25. As shown in FIGS. 29A and 29B, the stationary member 33 includes four upper magnetic poles 35 and four lower magnetic poles 36.

FIGS. 29A and 29B show magnetization states of the upper magnetic poles 35 and the lower magnetic poles 36 of the stationary member 33 of the rotary actuator 22, respectively. When N-poles and S-poles are, respectively, produced in the upper magnetic poles 35 and the lower magnetic poles 36 and an inner peripheral side and an outer peripheral side of the four magnets 37 are, respectively, magnetized to an S-pole and an N-pole by applying to the coil 34 electric current flowing in one direction, clockwise torque is produced between the magnets 37 of the movable member 32 and the upper magnetic poles 35 and the lower magnetic poles 36 of the stationary member 33, so that the movable member 32 is rotated clockwise as shown by the arrow. By reversing the magnetization direct ion based on the electric current inputted to the coil 34, the movable member 32 can be driven so as to be rotated in the opposite direction, i.e., counterclockwise. In the same manner as the coil 31 of the axial actuator 21, an AC voltage of sine wave or cosine wave is applied to also the coil 34 of the rotary actuator 22.

In this actuator, a frequency of the AC voltage applied to the coil 34 of the rotary actuator 22 is set at 1.5 times that of the AC voltage applied to the coil 31 of the axial actuator 21.

Figure 31:
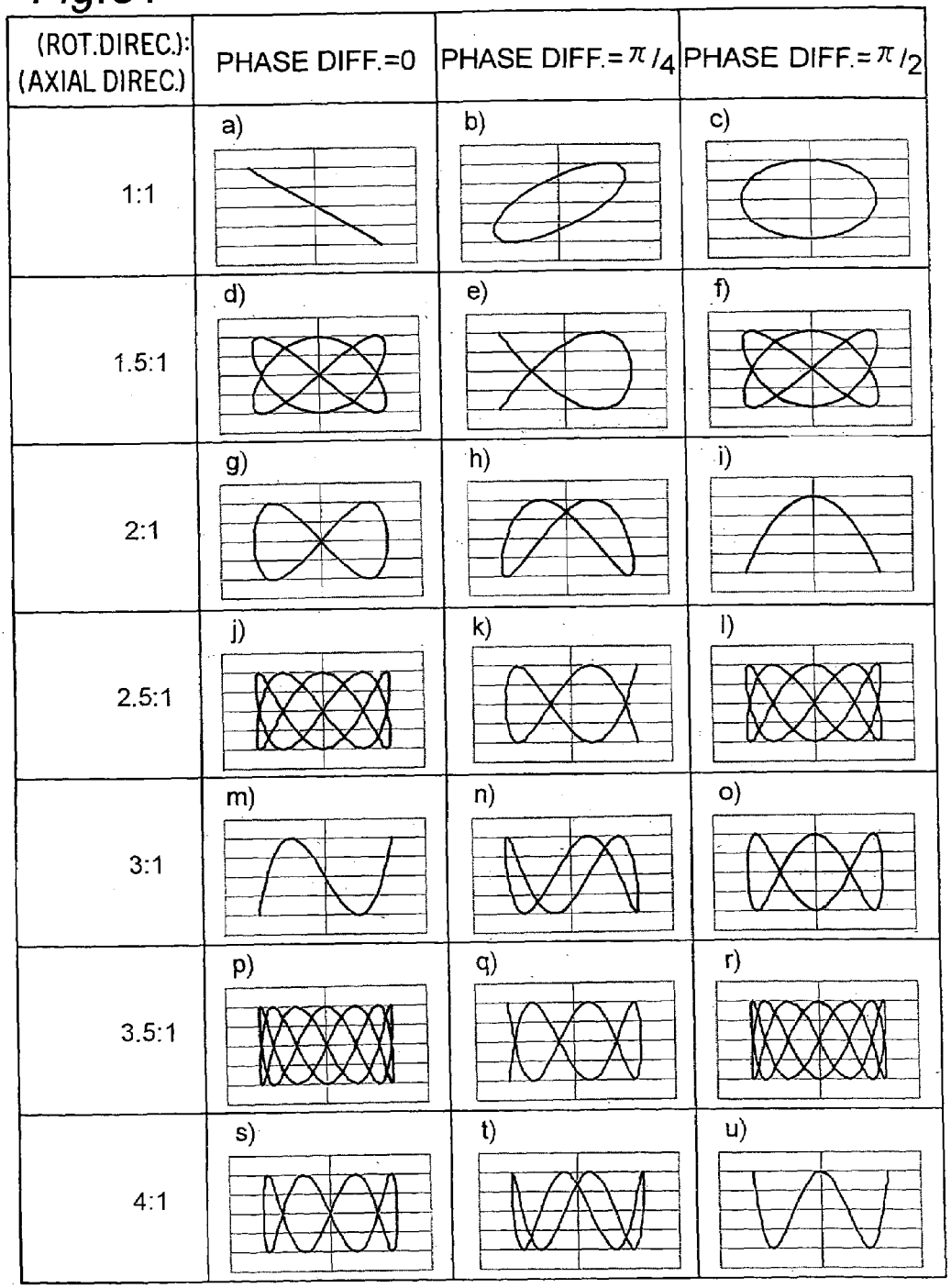
FIG. 31 is a view showing drive loci of a shaft employed in the actuator of FIG. 25.

By the above described arrangement of the actuator of the eleventh embodiment, the shaft 25 can be driven in two directions of the axial direction and the rotational direction by the axial actuator 21 and the rotary actuator 22 as shown in FIG. 31. In FIG. 31, the most left column represents ratio of the frequency fr of the AC voltage applied to the coil 34 of the rotary actuator 22 to the frequency fa of the AC voltage applied to the coil 31 of the axial actuator 21, i.e., (fr/fa) and a row and a column of each of graphs a) to h) indicate loci of the shaft 25 in the axial direction and in the rotational direction, respectively. For example, in FIG. 30, when the ratio of the frequency fr of the AC voltage of sine wave applied to the coil 34 of the rotary actuator 22 as shown by the broken line to the frequency fa of the AC voltage of sine wave applied to the coil 31 of the axial actuator 21 as shown by the solid line, i.e., (fr/fa) is (1.5:1), the shaft 25 is driven along the locus of the graph d) in FIG. 31. Even if phase difference between the AC voltages is set at ($\pi/2$), the shaft 25 is driven along the locus of the graph f) in the same manner as the graph d).

Meanwhile, if the ratio (fr/fa) is expressed by the equation {(fr/fa)=(2n+1)/2} in which "n" denotes an integer, the integer n is set at 1, 2 and 3 and the phase difference is set at 0 and ($\pi/2$), the shaft 25 can be driven along the loci of wider range as shown by the graphs d), f), j), l), p) and r) of FIG. 31.

Furthermore, if the ratio (fr/fa) is expressed by the equation {(fr/fa)=m} in which "m" denotes an integer, the integer m is set at 1 to 4 and the phase difference is set at 0, ($\pi/4$) and ($\pi/2$), the shaft 25 can be driven along the loci of linear motion or complicated elliptic motions as shown by the graphs b), c), g), h), n), o), s) and t) of FIG. 31.

In the eleventh embodiment referred to above, if the ratio of the frequency fr of the AC voltage applied to the coil 34 of the rotary actuator 22 to the frequency fa of the AC voltage applied to the coil 31 of the axial actuator 21, i.e., (fr/fa) is set by the above equations, the shaft 25 can be driven along the various complicated loci.

Hereinafter, effects gained in the present invention are listed. Initially, the effects achieved in the first to sixth embodiments are described. Firstly, since the force oriented in the axial direction is imparted to the movable member by exciting by the first coil the magnetic path passing through the first stationary member and the force oriented in the rotational direction is imparted to the movable member by exciting by the second coil the magnetic path passing through the second stationary member, motion of the movable member in the axial direction and motion of the movable member in the rotational direction can be controlled independently of each other. As a result, it is possible to upgrade degree of freedom of operation control of the actuator in which the movable member can be moved in two directions of the axial direction and the rotational direction without using the motion direction converting mechanism.

Meanwhile, since the masses of the magnets of the movable member are distributed symmetrically with respect to the rotational axis, inertia force based on motion of the movable member in the rotational direction is cancelled and thus, vibrations to be transmitted to the casing can be reduced.

Meanwhile, since a pair of the first stationary members apply to the movable member the force oriented in the axial direction by using the two sets of the magnetic pole portions disposed at the opposite sides of the magnets of the movable member, respectively and a pair of the second stationary members apply to the movable member the force oriented in the rotational direction by the using the two sets of the magnetic pole portions disposed at the opposite sides of the magnets of the movable member, respectively, the movable member can be moved with great force.

Meanwhile, since the axial plane containing a pair of the first stationary members 2 and the axial plane containing a pair of the second stationary members 4 intersect with each other substantially orthogonally, the space between the first stationary members and the second stationary members becomes large, so that the space for providing the first coil and the second coil can be made large.

Meanwhile, since the two magnets of the movable member have the opposite magnetization directions, respectively and the first stationary member has the three E-shaped magnetic pole portions, the magnetic pole portions of the first stationary member are disposed at the positions suitable for producing the force oriented in the axial direction when the two magnets of the movable member are positioned so as to confront the first stationary member, so that not only leakage flux is lessened but the movable member can be efficiently moved in the axial direction with great force.

Meanwhile, since the second stationary member has the two C-shaped magnetic pole portions, the magnetic pole portions of the second stationary member are disposed at the positions suitable for producing the force oriented in the rotational direction when the two magnets of the movable member are positioned so as to confront the two magnetic pole portions of the second stationary member, so that not only leakage flux is lessened but the movable member can be efficiently moved in the rotational direction with great force.

Meanwhile, since the opposite end portions of the magnetic pole portions of the first stationary member and the opposite end portions of the magnetic pole portions of the second stationary member overlap each other in three dimensions when viewed in the axial direction, each of the first stationary member and the second stationary member secures the space used as the area for confronting the movable member, so that the area for confrontation between each of the first stationary member and the second stationary member and the movable member can be increased and thus, the large force can be applied to the movable member.

Meanwhile, since the gap is formed between the magnetic pole portions of the first stationary member and the magnetic pole portions of the second stationary member, the magnetic reluctance of the magnetic path between the first stationary member and the second stationary member increases, so that the magnetic flux which does not contribute to application of the force to the movable member can be reduced.

Meanwhile, since the end portions of the magnets of the movable member are rotated so as to traverse the recesses among the magnetic pole portions of the first stationary member, the area in which the magnetic pole portions of the magnets of the movable member confront the magnetic pole portions of the first stationary member in the axial direction can be increased, so that the movable member can be moved in the axial direction with great force.

Meanwhile, since the two magnets of the movable member are formed into an identical size and not only the opposed end faces of the magnets are brought into contact with each other in the axial direction but the other end faces of the magnets opposite to the contacting opposed end faces are flush with the axial opposite end faces of the first stationary member, the position where the other end faces of the magnets are flush with the axial opposite end faces of the first stationary member acts as the stable point. Hence, as displacement of the movable member in the axial direction becomes large, larger force is applied to the movable member in the direction opposite to that of the displacement and thus, effect of the return spring can be gained.

Meanwhile, since the first coil is dividedly wound around the three magnetic pole portions of the first stationary member and the second coil is dividedly wound around the two magnetic pole portions of the second stationary member, effect of thickness of the wound first and second coils is lessened by dividing the first and second coils as compared with a case in which each of the first and second coils is wound around the single magnetic pole portion, so that the space for winding the first and second coils can be reduced.

Meanwhile, since the axial resonant spring is provided between the movable member and the casing, the movable member is capable of efficiently performing reciprocating motion in the axial direction at the large amplitude on the basis of the resonance phenomenon when the AC voltage is applied, to the first coil at the frequency close to the resonant frequency determined by the mass of the movable member and the spring constant of the axial resonant spring.

Meanwhile, since the rotational resonant spring is further provided between the movable member and the casing, the movable member is capable of efficiently performing reciprocating motion in the rotational direction at the large amplitude on the basis of the resonant phenomenon when the AC voltage is applied to the second coil at the frequency close to the resonant frequency determined by the moment of inertia of the movable member and the spring constant of the rotational resonant spring.

Moreover, since the single spring member acts not only as the axial resonant spring but as the rotational resonant spring, the space for providing the spring member can be reduced.

Then, the effects obtained in the seventh to tenth embodiments are described. Firstly, since the spring resonant system is constituted by the movable member, the further movable member, the casing and the spring member including the three springs provided among these members and deflectable in the axial direction, motion of the movable member in the axial direction and motion of the movable member in the rotational direction can be controlled independently of each other. Thus, it is possible to upgrade the degree of freedom of operational control of the actuator in which the movable member can be moved in the two directions of the axial direction and the rotational direction. Meanwhile, in the resonant motion in the axial direction, since the movable member and the further movable member can be, respectively, moved oppositely in the axial direction, it is possible to lessen the vibrations due to the axial inertia force.

Meanwhile, since the first stationary member and the second stationary member imparts to one of the movable member and the further movable member the force oriented in the axial direction and the force oriented in the rotational direction, respectively, the other of the movable member and the further movable member does not undergo the forces from the first stationary member and the second stationary member, so that design of the spring resonant system is facilitated.

Meanwhile, since the first stationary member imparts to one of the movable member and the further movable member the force oriented in the axial direction and the second stationary member imparts to the other of the movable member and the further movable member the force oriented in the rotational direction, the magnetic path for generating the force oriented in the axial direction and the magnetic path for generating the force oriented in the rotational direction are separated from each other, so that the magnetic circuit can be designed easily.

Meanwhile, since one of the movable member and the further movable member, which undergoes the forces from the first stationary member and the second stationary member, includes the magnet which has the magnetization direction substantially orthogonal to the axial direction and is provided symmetrically with respect to the rotational axis and the first stationary members and the second stationary members are, respectively, provided symmetrically with respect to the rotational axis, the first stationary member and the second stationary member impart to the one of the movable member and the further movable member the force oriented in the axial direction and the force oriented in the rotational direction, so that the spring resonant system can be moved with great force.

Meanwhile, since one of the movable member and the further movable member, which undergoes the force oriented in the axial direction from the first stationary member, includes the two magnets having the opposite magnetization directions, respectively and the first stationary member has the three E-shaped magnetic pole portions, the magnetic pole portions of the first stationary member are disposed at the positions suitable for producing the force oriented in the axial direction when the two magnets are positioned so as to confront the first stationary member, so that not only leakage flux is lessened but the spring resonant system can be efficiently moved in the axial direction with great force.

Meanwhile, since one of the movable member and the further movable member, which undergoes the force oriented in the rotational direction from the second stationary member, includes the two magnets having the opposite magnetization directions, respectively and the second stationary member has the two C-shaped magnetic pole portions, the magnetic pole portions of the second stationary member are disposed at the positions suitable for producing the force oriented in the rotational direction when the two magnets are positioned so as to confront the two magnetic pole portions of the second stationary member, so that not only leakage flux is lessened but the one of the movable member and the further movable member can be efficiently moved in the rotational direction with great force.

In addition, since the end portions of the magnets are rotated so as to traverse the recesses among the magnetic pole portions of the first stationary member, the area in which the magnetic pole portions of the magnets confront the magnetic pole portions of the first stationary member in the axial direction can be increased, so that the spring resonant system can be moved in the axial direction with great force.

The invention claimed is:

1. An actuator comprising:
 a casing;
 a stationary member which has a coil member and is mounted in the casing; and a movable member which includes a moving element and is supported by the casing;
wherein the moving element has a shaft and is supported by the casing so as to be moved in an axial direction of the shaft and in a rotational direction having the axial direction of the shaft as its rotational axis;
wherein electric current is caused to flow through the coil member such that the moving element is moved in the axial direction and in the rotational direction;
wherein the stationary member includes a first stationary member that imparts to the movable member a force oriented in the axial direction and a second stationary member that imparts to the movable member a force oriented in the rotational direction;
wherein the first stationary member includes a pair of first stationary elements provided symmetrically with respect to the rotational axis and the second stationary member includes a pair of second stationary elements provided symmetrically with respect to the rotational axis;
wherein the coil member includes a first coil member that excites a first magnetic path passing through the first stationary member and a second coil member that excites a second magnetic path passing through the second stationary member;
wherein the first stationary member imparts to the moving element the force oriented in the axial direction and the second stationary member imparts to the moving element the force oriented in the rotational direction;
wherein the moving element includes a magnet member having a magnetization direction substantially orthogonal to the axial direction;
wherein the first coil member includes a pair of first coils each provided in each of the first stationary elements and the second coil member includes a pair of second coils each provided in each of the second stationary elements; and
wherein the first coils excite the first stationary elements in an antiphase excitation mode, respectively and the second coils excite the second stationary elements in an antiphase excitation mode, respectively.

2. The actuator as claimed in claim 1, wherein the magnet member of the moving element is disposed symmetrically with respect to the rotational axis.

3. The actuator as claimed in claim 1, wherein the first stationary elements and the second stationary elements are disposed such that an axial plane containing the first stationary elements and an axial plane containing the second stationary elements intersect with each other substantially orthogonally.

4. The actuator as claimed in claim 1, wherein the magnet member of the moving element includes two magnets having opposite magnetization directions, respectively and each of the first stationary elements is formed by a substantially E-shaped magnetic part having three magnetic pole portions arranged in the axial direction.

5. The actuator as claimed in claim 4, wherein each of the second stationary elements is formed by a substantially C-shaped magnetic part having two magnetic pole portions arranged in the axial direction.

6. The actuator as claimed in claim 5, wherein opposite end portions of each of the first stationary elements and opposite end portions of each of the second stationary elements overlap each other when viewed in the axial direction.

7. The actuator as claimed in claim 6, wherein a gap is formed between each of the magnetic pole portions of each of the first stationary elements and each of the magnetic pole portions of each of the second stationary elements.

8. The actuator as claimed in claim 5, wherein an end portion of each of the magnets of the moving element is rotated so as to traverse each of two recesses among the magnetic pole portions of each of the first stationary elements.

9. The actuator as claimed in claim 5, wherein the magnets of the moving element are formed into an identical size;
wherein the magnets are provided such that not only opposed end faces of the magnets are brought into contact with each other in the axial direction, but other end faces of the magnets opposite to the contacting opposed end faces are axially flush with axial opposite end faces of each of the first stationary elements, respectively.

10. An actuator comprising:
a casing;
a stationary member which has a coil member and is mounted in the casing;
a movable member which includes a moving element and is supported by the casing; and
a rotational resonant spring that effects resonant motion of the moving element in the rotational direction, which is provided between the moving element and the casing;
wherein the moving element has a shaft and is supported by the casing so as to be moved in an axial direction of the shaft and in a rotational direction having the axial direction of the shaft as its rotational axis;
wherein electric current is caused to flow through the coil member such that the moving element is moved in the axial direction and in the rotational direction;
wherein the stationary member includes a first stationary member that imparts to the movable member a force oriented in the axial direction and a second stationary member that imparts to the movable member a force oriented in the rotational direction; and
wherein the coil member includes a first coil member that excites a first magnetic path passing through the first stationary member and a second coil member that excites a second magnetic path passing through the second stationary member.

11. An actuator comprising:
a casing;
a stationary member which has a coil member and is mounted in the casing;
a movable member which includes a moving element and is supported by the casing; and
a spring member which includes a first spring provided between the casing and the moving element, a second spring provided between the moving element and the further moving element and a third spring provided between the further moving element and the casing such that the first, second and third springs are deflectable in the axial direction;
wherein the moving element has a shaft and is supported by the casing so as to be moved in an axial direction of the shaft and in a rotational direction having the axial direction of the shaft as its rotational axis;
wherein electric current is caused to flow through the coil member such that the moving element is moved in the axial direction and in the rotational direction;
wherein the stationary member includes a first stationary member that imparts to the movable member a force oriented in the axial direction and a second stationary member that imparts to the movable member a force oriented in the rotational direction;

wherein the coil member includes a first coil member that excites a first magnetic path passing through the first stationary member and a second coil member that excites a second magnetic path passing through the second stationary member;

wherein the movable member further includes a further moving element disposed coaxially with the moving element and movable in the axial direction;

wherein the first stationary member and the second stationary member impart to one of the moving element and the further moving element the force oriented in the axial direction and the force oriented in the rotational direction, respectively;

wherein the one of the moving element and the further moving element includes a magnet member disposed symmetrically with respect to the rotational axis and having a magnetization direction substantially orthogonal to the axial direction;

wherein the first stationary member includes a pair of first stationary elements provided symmetrically with respect to the rotational axis and the second stationary member includes a pair of second stationary elements provided symmetrically with respect to the rotational axis;

wherein the first coil member includes a pair of first coils each provided in each of the first stationary elements and the second coil member includes a pair of second coils each provided in each of the second stationary elements;

wherein the first coils excite the first stationary elements in an antiphase excitation mode, respectively and the second coils excite the second stationary elements in an antiphase excitation mode, respectively;

wherein the magnet member of the one of the moving element and the further moving element includes two magnets having opposite magnetization directions, respectively, with the one of the moving element and the further moving element undergoing the force oriented in the axial direction from the first stationary member; and wherein each of the first stationary elements is formed by a substantially E-shaped magnetic part having three magnetic pole portions arranged in the axial direction.

12. The actuator as claimed in claim 11, wherein the magnet member of the one of the moving element and the further moving element includes two magnets having opposite magnetization directions, respectively, with the one of the moving element and the further moving element undergoing the force oriented in the rotational direction from the second stationary member;

wherein each of the second stationary elements is formed by a substantially C-shaped magnetic part having two magnetic pole portions arranged in the axial direction.

13. The actuator as claimed in claim 11, wherein an end portion of each of the magnets is rotated so as to traverse each of two recesses among the magnetic pole portions of each of the first stationary elements.

14. An actuator comprising:
a casing;
a stationary member which has a coil member and is mounted in the casing;
a movable member which includes a moving element and is supported by the casing; and
a spring member which includes a first spring provided between the casing and the moving element, a second spring provided between the moving element and the further moving element and a third spring provided between the further moving element and the casing such that the first, second and third springs are deflectable in the axial direction;

wherein the moving element has a shaft and is supported by the casing so as to be moved in an axial direction of the shaft and in a rotational direction having the axial direction of the shaft as its rotational axis;

wherein electric current is caused to flow through the coil member such that the moving element is moved in the axial direction and in the rotational direction;

wherein the stationary member includes a first stationary member that imparts to the movable member a force oriented in the axial direction and a second stationary member that imparts to the movable member a force oriented in the rotational direction;

wherein the coil member includes a first coil member that excites a first magnetic path passing through the first stationary member and a second coil member that excites a second magnetic path passing through the second stationary member;

wherein the movable member further includes a further moving element disposed coaxially with the moving element and movable in the axial direction;

wherein the first stationary member imparts to one of the moving element and the further moving element the force oriented in the axial direction and the second stationary member imparts to the other of the moving element and the further moving element the force oriented in the rotational direction;

wherein each of the moving element and the further moving element includes a magnet member disposed symmetrically with respect to the rotational axis and having a magnetization direction substantially orthogonal to the axial direction;

wherein the first stationary member includes a pair of first stationary elements provided symmetrically with respect to the rotational axis and the second stationary member includes a pair of second stationary elements provided symmetrically with respect to the rotational axis;

wherein the first coil member includes a pair of first coils each provided in each of the first stationary elements and the second coil member includes a pair of second coils each provided in each of the second stationary elements;

wherein the first coils excite the first stationary elements in an antiphase excitation mode, respectively and the second coils excite the second stationary elements in an antiphase excitation mode, respectively;

wherein the magnet member of the one of the moving element and the further moving element includes two magnets having opposite magnetization directions, respectively, with the one of the moving element and the further moving element undergoing the force oriented in the axial direction from the first stationary member; and wherein each of the first stationary elements is formed by a substantially E-shaped magnetic part having three magnetic pole portions arranged in the axial direction.

15. The actuator as claimed in claim 14, wherein the magnet member of the other of the moving element and the further moving element includes two magnets having opposite magnetization directions, respectively, with the other of the moving element and the further moving element undergoing the force oriented in the rotational direction from the second stationary member;

wherein each of the second stationary elements is formed by a substantially C-shaped magnetic part having two magnetic pole portions arranged in the axial direction.

\* \* \* \* \*